(12) United States Patent
Stenneth

(10) Patent No.: US 11,150,650 B2
(45) Date of Patent: Oct. 19, 2021

(54) METHOD, APPARATUS, AND SYSTEM FOR OPERATING A VEHICLE BASED ON VULNERABLE ROAD USER DATA

(71) Applicant: HERE GLOBAL B.V., Eindhoven (NL)

(72) Inventor: Leon Stenneth, Chicago, IL (US)

(73) Assignee: HERE Global B.V., Eindhoven (NL)

(*) Notice: Subject to any disclaimer, the term of this patent is extended or adjusted under 35 U.S.C. 154(b) by 74 days.

(21) Appl. No.: 16/036,676

(22) Filed: Jul. 16, 2018

(65) Prior Publication Data
US 2020/0019161 A1 Jan. 16, 2020

(51) Int. Cl.
*B60W 50/14* (2020.01)
*G01C 21/30* (2006.01)
(Continued)

(52) U.S. Cl.
CPC .......... *G05D 1/0061* (2013.01); *B60W 50/14* (2013.01); *G01C 21/30* (2013.01); *G05D 1/0088* (2013.01);
(Continued)

(58) Field of Classification Search
CPC .. G06D 1/0061; G08G 1/0133; G08G 1/0129; G08G 1/0141; G08G 1/096775; B60W 50/14; B60W 2050/143; B60W 2554/00; B60W 2554/4026; B60W 2554/4029; B60W 2556/10; G01C 21/30; G01C 21/3461; G06F 16/29
See application file for complete search history.

(56) References Cited

U.S. PATENT DOCUMENTS

2010/0063736 A1* 3/2010 Hoetzer ............... B60W 30/09
701/301
2016/0061625 A1* 3/2016 Wang .................... G08G 1/012
701/454
(Continued)

FOREIGN PATENT DOCUMENTS

DE  10 2016 212 700 A1    1/2018
JP       2007257338 A  * 10/2007
(Continued)

OTHER PUBLICATIONS

Cafiso et al., "In-vehicle Stereo Vision System for Identification of Traffic Conflicts Between Bus and Pedestrian", retrieved on May 11, 2018 from https://reader.elsevier.com/reader/sd/5A9FE4372A4F7F33D5FF533761D48D377ECED0A240F93266BD183F7EF884E6FD4417F0EF568DA43D7D3D31C65CB387B4, published in Journal of Traffic and Transportation Engineering (English Edition) vol. 4, Issue 1, Feb. 2017, pp. 3-13.

*Primary Examiner* — Anshul Sood
(74) *Attorney, Agent, or Firm* — Ditthavong, Steiner & Mlotkowski

(57) ABSTRACT

An approach is provided for operating a vehicle using vulnerable road user data. The approach, for example, involves determining a road link on which the vehicle is traveling or expects to travel. The approach also involves querying a geographic database for a vulnerable road user attribute of the road link. The approach further involves providing a notification to activate or deactivate an autonomous driving mode of the vehicle, a vehicle sensor of the vehicle, or a combination thereof while the vehicle travels on the road link based on determining that the vulnerable road user attribute meets a threshold criterion.

19 Claims, 19 Drawing Sheets

(51) Int. Cl.
*G08G 1/01* (2006.01)
*G08G 1/0967* (2006.01)
*G05D 1/00* (2006.01)
*G06F 16/29* (2019.01)

(52) U.S. Cl.
CPC ........... *G06F 16/29* (2019.01); *G08G 1/0133* (2013.01); *G08G 1/0141* (2013.01); *G08G 1/096725* (2013.01); *B60W 2050/143* (2013.01); *B60W 2420/403* (2013.01); *B60W 2420/52* (2013.01); *B60W 2554/00* (2020.02); *G05D 2201/0213* (2013.01)

(56) References Cited

U.S. PATENT DOCUMENTS

| | | | |
|---|---|---|---|
| 2016/0086285 A1 | 3/2016 | Jordan Peters et al. | |
| 2017/0259814 A1* | 9/2017 | Fujimura | B60W 50/14 |
| 2017/0268896 A1 | 9/2017 | Bai et al. | |
| 2018/0239352 A1* | 8/2018 | Wang | G05D 1/0061 |
| 2019/0011925 A1* | 1/2019 | Bansal | G05D 1/0214 |

FOREIGN PATENT DOCUMENTS

| | | | |
|---|---|---|---|
| JP | 2008146549 A | * | 6/2008 |
| WO | 2016088067 A2 | | 6/2016 |
| WO | 2016135561 A1 | | 9/2016 |

* cited by examiner

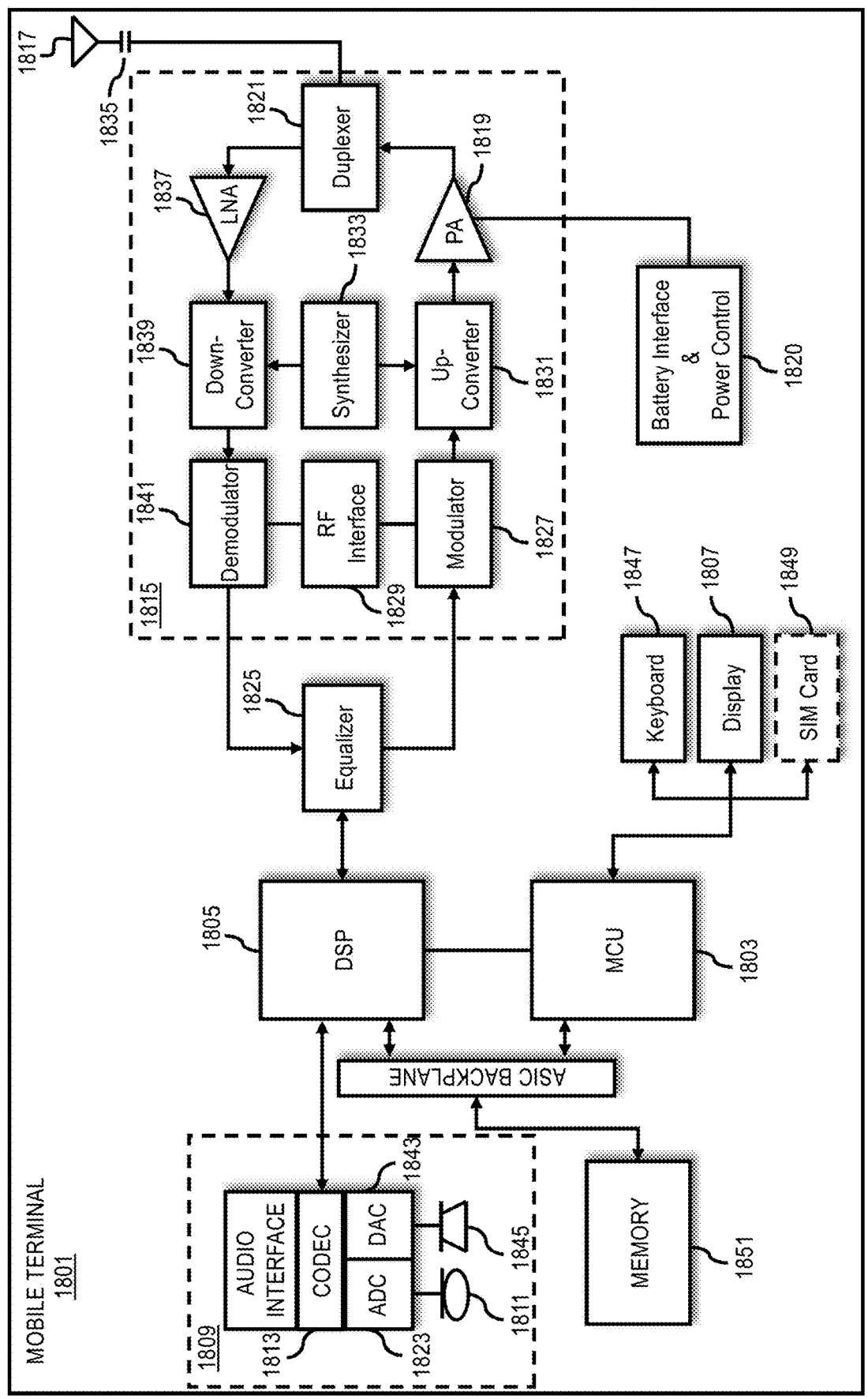

METHOD, APPARATUS, AND SYSTEM FOR OPERATING A VEHICLE BASED ON VULNERABLE ROAD USER DATA

BACKGROUND

Providing environmental awareness for vehicle safety, particularly in autonomous driving, has been a primary concern for automobile manufacturers and related service providers. For example, having data on where vulnerable road users (VRUs) (e.g., pedestrians, other non-vehicular road users/objects, etc.) are in a road network can potentially enable autonomous and/or other vehicles to take actions to decrease the potential for collisions with VRUs, thereby increasing road safety. However, mapping VRUs over a wide geographic area has historically been resource-intensive. Accordingly, service providers face significant technical challenges to more efficiently detect and map VRUs on road segments or links of digital maps (e.g., geographic databases).

SOME EXAMPLE EMBODIMENTS

Therefore, there is a need for generating a digital map of VRUs and operating a vehicle based on the VRU data.

According to one embodiment, a computer-implemented method for operating a vehicle using vulnerable road user data comprises determining a road link on which the vehicle is traveling or expects to travel. The method also comprises querying a geographic database for a vulnerable road user attribute of the road link. The method further comprises providing a notification to activate or deactivate an autonomous driving mode of the vehicle, a vehicle sensor of the vehicle, or a combination thereof while the vehicle travels on the road link based on determining that the vulnerable road user attribute meets a threshold criterion.

According to another embodiment, an apparatus for operating a vehicle using vulnerable road user data comprises at least one processor, and at least one memory including computer program code for one or more computer programs, the at least one memory and the computer program code configured to, with the at least one processor, cause, at least in part, the apparatus to determine a road link on which the vehicle is traveling or expects to travel. The apparatus is also caused to query a geographic database for a vulnerable road user attribute of the road link. The apparatus is further caused to provide a notification to activate or deactivate an autonomous driving mode of the vehicle, a vehicle sensor of the vehicle, or a combination thereof while the vehicle travels on the road link based on determining that the vulnerable road user attribute meets a threshold criterion.

According to another embodiment, a non-transitory computer-readable storage medium for operating a vehicle using vulnerable road user data carries one or more sequences of one or more instructions which, when executed by one or more processors, cause, at least in part, an apparatus to determine a road link on which the vehicle is traveling or expects to travel. The apparatus is also caused to query a geographic database for a vulnerable road user attribute of the road link. The apparatus is further caused to provide a notification to activate or deactivate an autonomous driving mode of the vehicle, a vehicle sensor of the vehicle, or a combination thereof while the vehicle travels on the road link based on determining that the vulnerable road user attribute meets a threshold criterion.

According to another embodiment, an apparatus for operating a vehicle using vulnerable road user data comprises means for determining a road link on which the vehicle is traveling or expects to travel. The apparatus also comprises means for querying a geographic database for a vulnerable road user attribute of the road link. The apparatus further comprises means for providing a notification to activate or deactivate an autonomous driving mode of the vehicle, a vehicle sensor of the vehicle, or a combination thereof while the vehicle travels on the road link based on determining that the vulnerable road user attribute meets a threshold criterion.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing a method of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIG. 18 is a diagram of a mobile terminal (e.g., handset or vehicle or part thereof) that can be used to implement an embodiment.

DESCRIPTION OF SOME EMBODIMENTS

Examples of a method, apparatus, and computer program for mapping vulnerable road users (VRUs) are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
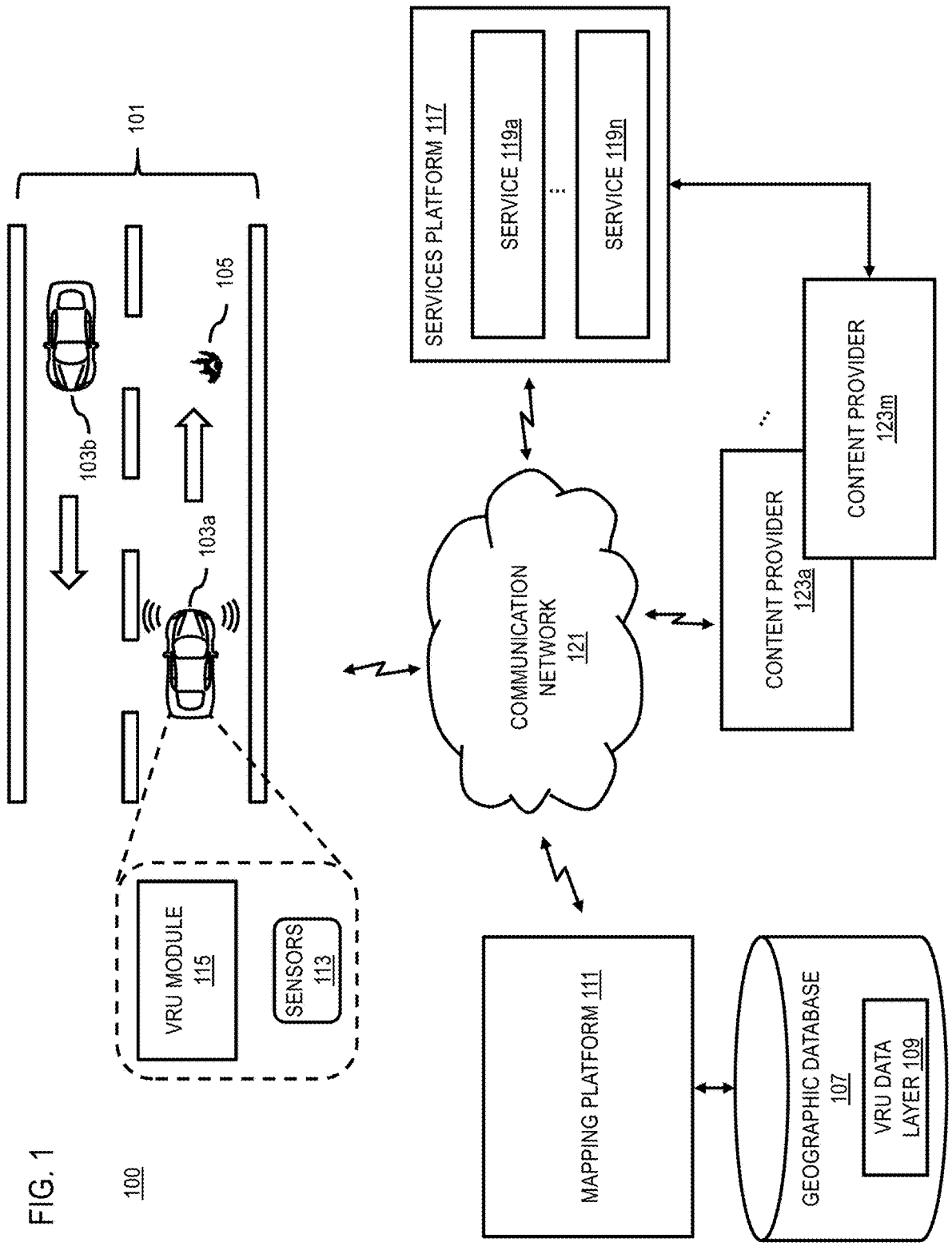
FIG. 1 is a diagram of a system capable of mapping vulnerable road users (VRUs), according to one embodiment.

FIG. 1 is a diagram of a system capable of mapping vulnerable road users (VRUs), according to one embodiment. Many roads (e.g., a road 101 as shown in FIG. 1) are located in areas where the roads are shared between vehicles 103a-103b (also collectively referred to as vehicles 103) and VRUs (e.g., VRU 105 such as a pedestrian). As used herein, there term VRU refers to any person or object that is on or near a road 101 without the protection of an enclosed vehicle 103. For example, VRUs include but are not limited to pedestrians, bicyclists, motorcyclists, workers, emergency personnel, and/or the like. In one embodiment, in addition to people, VRUs can include objects that may also operate or be located on or near a road 101. These objects include but are not limited to construction equipment, cleaning equipment, road furniture, road debris, etc. In other words, VRUs can be any person or object that may be exposed to potential collisions with a vehicle 103 traveling on the road 101.

Having knowledge of whether VRUs are present or absent on a road segment can provide important situational awareness and improved safety to vehicles, particularly autonomous vehicles that operate with reduced or no human driver input. In other words, an understanding of where VRUs may potentially be located is important for an autonomous vehicle to safely operate, plan a route, etc. For example, as shown in FIG. 1, the road 101 may support use by vehicles 103, and well as pedestrians (e.g., by the VRU 105). By using the road 101, the VRU 105 is exposed to potential collision with the vehicles 103, therefore it would be advantageous for the vehicles 103 to have data on whether they may encounter VRUs 105 on the road 101 on which they are traveling. However, gathering VRU data has historically been resource intensive because of the difficulty of detection and the large geographic areas that have be monitored. In addition, because the appearance of VRUs 105 on given road segments or links can be fleeting because their movements are dynamic, keeping VRU data current is also technically challenging and resource intensive, particularly for real-time applications such as autonomous driving.

To address these challenges, a system 100 of FIG. 1 introduces a capability to generate data indicating the presence or patterns of occurrence of VRUs on road links of a digital map. The digital map, for instance, can be a geographic database 107 or a VRU data layer 109 of the geographic database 107. In one embodiment, the mapping platform 111 can be a cloud-based platform that collects and processes sensor data from sensors 113 of the vehicles 103 that indicate a VRU detection. In addition or alternatively, the mapping platform 111 can collect VRU messages generated by VRU modules 115 of the vehicles 103 as they travel in a road network. The VRU messages are generated and transmitted by the VRU modules 115 (e.g., in real-time or near real-time) to indicate that the vehicle 103 has detected the presence of a VRU 105 using its sensors 113.

Figure 2:
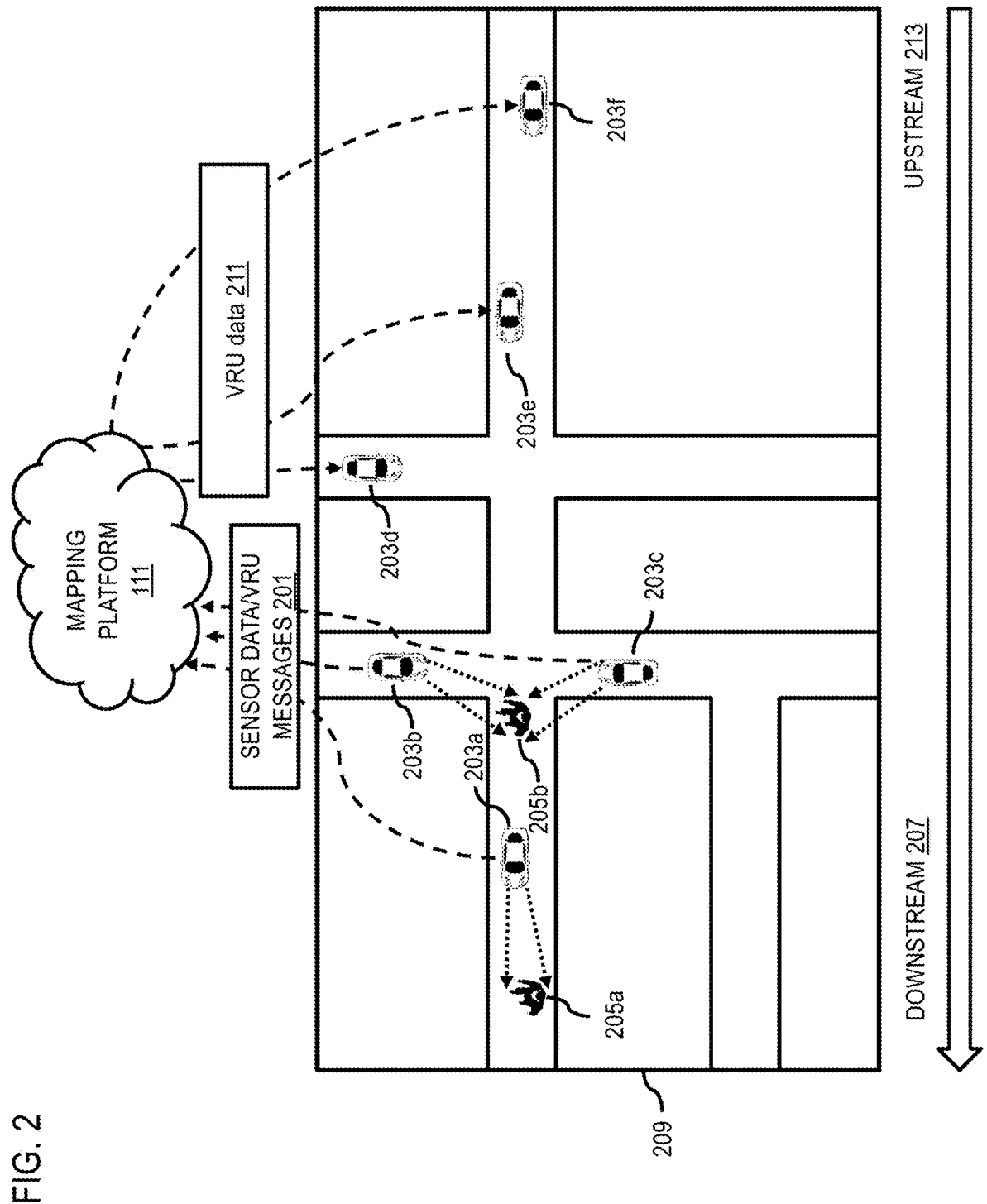
FIG. 2 is a diagram illustrating an example cloud-based architecture for mapping VRUs, according to one embodiment.

FIG. 2 is a diagram illustrating an example cloud-based architecture for mapping of VRUs, according to one embodiment. As shown in FIG. 2, the mapping platform 111 can collect sensor data and/or VRU messages 201 from vehicles 203a-203b that respectively detect VRUs 205a and 205b (e.g., using a camera sensor) in a downstream area 207 of a road network 209. The mapping platform 111 processes the collected sensor data and/or VRU messages 201 to generate VRU data 211 for the corresponding road or portion thereof in the downstream area 207 of the road network 209. For example, the VRU data 211 can be computed for an entire road link, a node, or a segment of the road link (e.g., 5-meter segments) corresponding to the area from which the sensor data and/or VRU messages 201 were collected. The mapping platform 111 can then publish the VRU data 211 to other vehicles 203d-203f traveling in an upstream area 213 of the road network 209. In this way, the vehicles 203d-203f can have prior knowledge of the presence or likely presence of VRUs before approaching the downstream area 207 or before the downstream area 207 is within the sensor range of the vehicles 203d-203f for direct detection of VRUs. Based on this detection, the vehicles 203d-203f in the upstream area 213 can take actions to mitigate potential collisions with VRUs such as but not limited to deactivating autonomous driving modes so that drivers can take manual control, activating additional or advanced sensors to enhance their capabilities to detect VRUs, routing around the road links where the VRUs were detected, etc.

As noted above, the VRU data 211 can be stored in and/or provided to the vehicles in the digital map data of the geographic database 107 and/or the VRU data layer 109. In one embodiment, the VRU data 211 can contain a parametric road link attribute (e.g., a VRU attribute) to indicate the probability that VRUs might be present on the associated road link, node, or segment of the road link. The VRU attribute can indicate the probability using any metric. Examples of this metric include but are not limited to a normalized probability with a value from 0 to 1, a binary value indicating either HIGH probability (also a true condition, 1, or equivalent binary representation) or LOW probability (also a false condition, 0, or equivalent binary representation), a real number indicating a mean (e.g., mean number of observed VRUs), real number indicating other VRU statistics (e.g., variance, maximum, minimum, etc.) and/or the like. For example, in an embodiment using a binary value, the mapping platform 111 can set the default value of the VRU attribute to HIGH (or equivalent). The mapping platform 111 can then set the VRU attribute to low for a given road link if VRU-related sensor data or VRU messages collected from the road link indicate that the no VRUs are present on the road link on average. In one embodiment, the VRU attribute can be determined independently for different time epochs of any configured duration. For example, if the time epochs are 15-minutes each in duration, a different VRU attribute value is generated for each 15-minute time epoch over a predetermined time period (e.g., over a 24-hour day for a total 96 time epochs, or any other time period).

In one embodiment, the mapping platform 111 can use other map features that are correlated with the presence or absence of VRUs on a road link in addition or as an alternate to the sensor data or VRU messages that directly detect VRUs. For example, the presence of physical dividers or structural separators along road segments that partition VRUs from vehicular traffic can be used to set the VRU attribute of the road link to LOW probability even if VRUs are otherwise detected. This is because the presence of the physical dividers can improve safety by reducing the probability of collisions with pedestrians or other VRUs by physically separating them.

Figure 3:
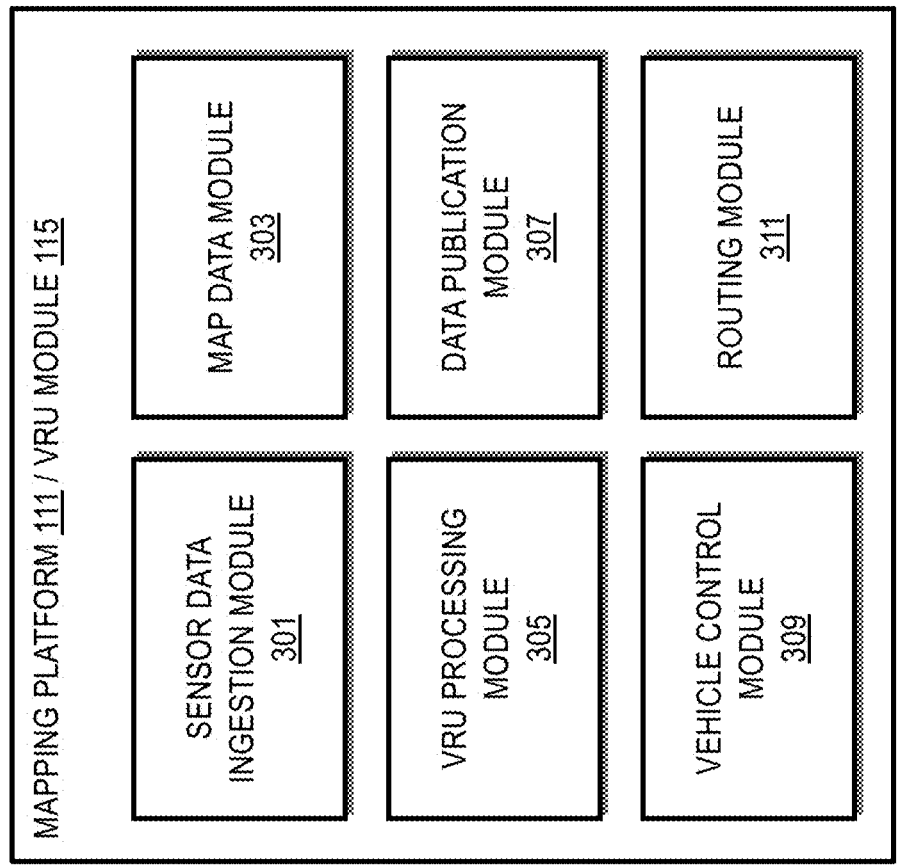
FIG. 3 is a diagram of the components of a mapping platform, according to one embodiment.

In one embodiment, the mapping platform 111 performs the functions associated with mapping VRUs according to the embodiments described herein. FIG. 3 is a diagram of the components of the mapping platform 111, according to one embodiment. In one embodiment, the VRU module 115 of the vehicle 103 can perform all or a portion of the VRU-related functions of the mapping platform 111 alone or more in combination with the mapping platform 111. By way of example, the mapping platform 111 and/or VRU module 115 include one or more components for mapping VRUs on a road segment according to the various embodiments described herein. It is contemplated that the functions of these components may be combined or performed by other components of equivalent functionality. In this embodiment, the mapping platform 111 and/or VRU module 115 include a sensor data ingestion module 301, a map data module 303, a VRU processing module 305, a data publication module 307, a vehicle control module 309, and a routing module 311. The above presented modules and components of the mapping platform 111 and/or VRU module 115 can be implemented in hardware, firmware, software, or a combination thereof. Though depicted as separate entities in FIG. 1, it is contemplated that the mapping platform 111 and/or VRU module 115 may be implemented as a module of any of the components of the system 100 (e.g., a component of the vehicle 103, services platform 117, services 119a-119n (also collectively referred to as services 119), etc.). In another embodiment, one or more of the modules 301-311 may be implemented as a cloud-based service, local service, native application, or combination thereof. The functions of the mapping platform 111, VRU module 115, and modules 301-311 are discussed with respect to FIGS. 4-14 below.

Figure 4:
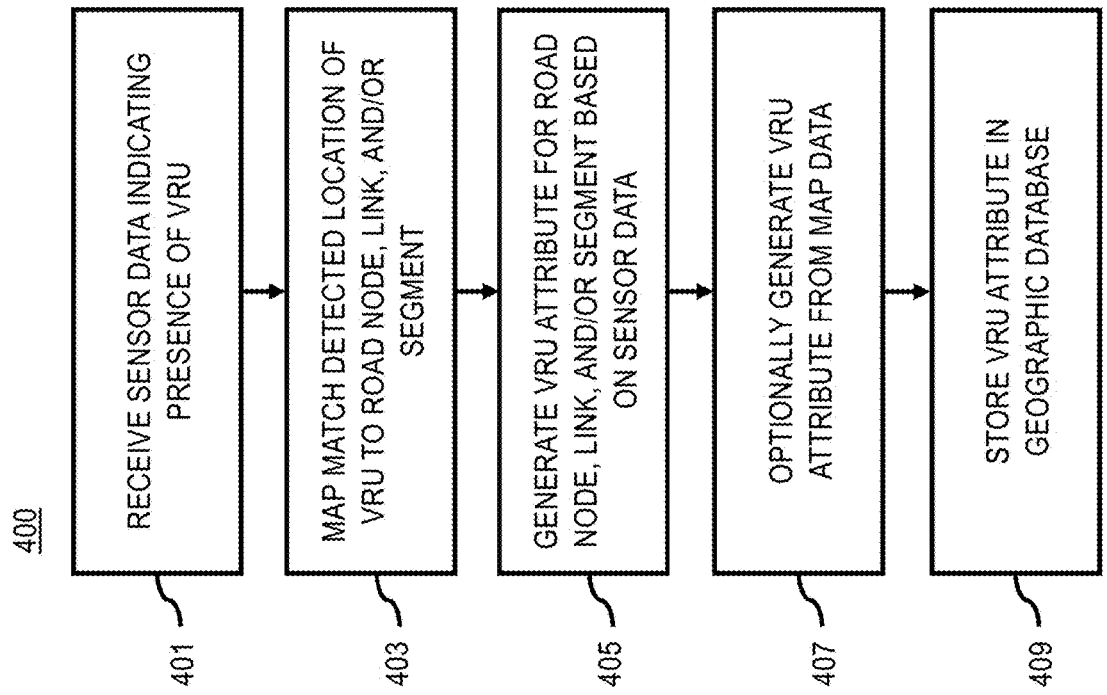
FIG. 4 is a flowchart of a process for generating VRU data for a geographic database, according to one embodiment.
Figure 17:
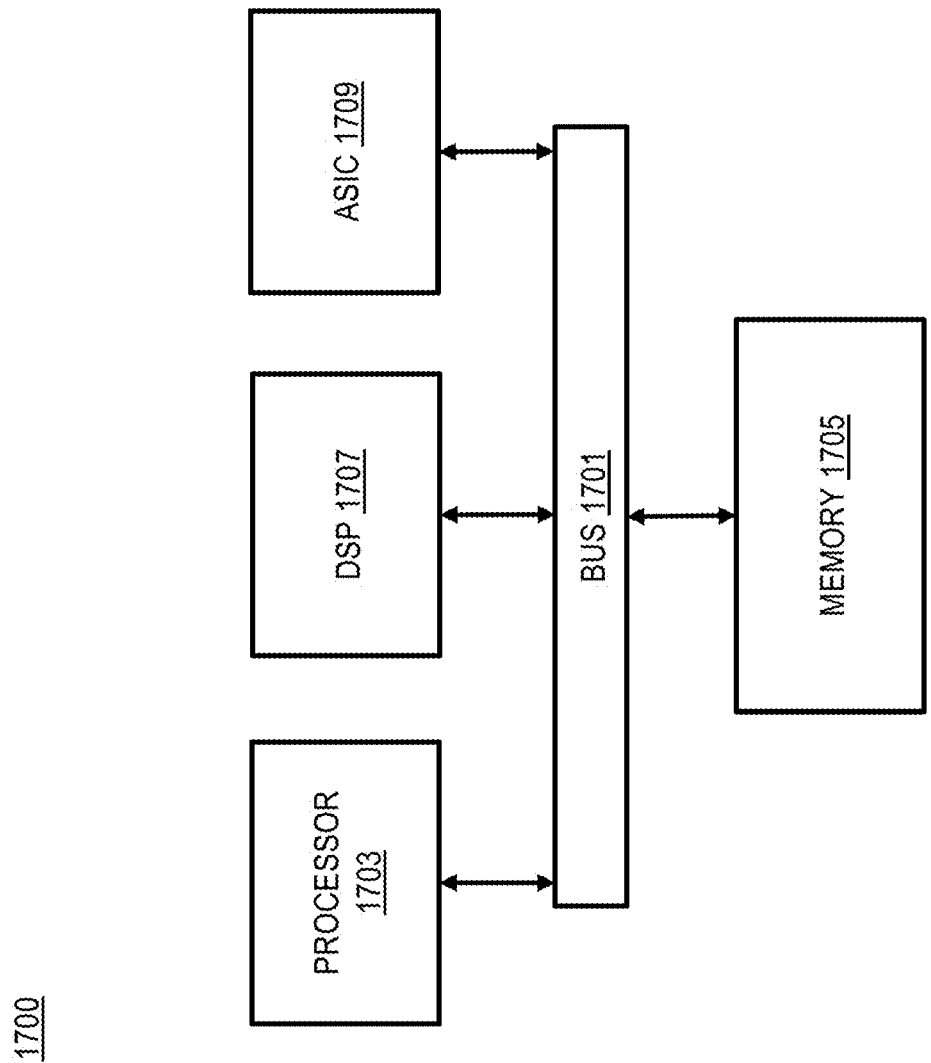
FIG. 17 is a diagram of a chip set that can be used to implement an embodiment.

FIG. 4 is a flowchart of a process for generating VRU data for a geographic database, according to one embodiment. In various embodiments, the mapping platform 111, VRU module 115, and/or any of the modules 301-311 may perform one or more portions of the process 400 and may be implemented in, for instance, a chip set including a processor and a memory as shown in FIG. 17. As such, mapping platform 111, VRU module 115, and/or any of the modules 301-311 can provide means for accomplishing various parts of the process 400, as well as means for accomplishing embodiments of other processes described herein in conjunction with other components of the system 100. Although the process 400 is illustrated and described as a sequence of steps, its contemplated that various embodiments of the process 400 may be performed in any order or combination and need not include all of the illustrated steps.

In step 401, the sensor data ingestion module 301 receives sensor data and/or VRU messages (e.g., VRU data) from at least one vehicle indicating a presence of at least one VRU. The sensor data indicates at least a detected location of the at least one VRU. In one embodiment, the VRU data is collected by vehicles 103 as they drive in a road network. By way of example, the vehicles 103 can include but are not limited to customer vehicles alone or in combination with specialized mapping vehicles operated by map service providers. As each reporting vehicle 103 drives, the vehicle 103 detects VRUs (e.g., a person moving on or near the road on which the vehicle 103 is driving) and sends the information to the mapping platform 111. In one embodiment, VRU data can be sent directly from the vehicle 103 to the mapping platform 111. Alternatively, the vehicle 103 can send the VRU data to an intervening platform (e.g., a platform operated by a vehicle manufacturer or Original Equipment Manufacturer (OEM)). The intervening platform can then send the VRU data to the mapping platform 111 for processing according to the embodiments described herein. In one embodiment, the intervening platform (e.g., an OEM platform) can anonymize or otherwise pre-process the VRU data before providing the VRU data to the mapping platform 111.

Figure 5:
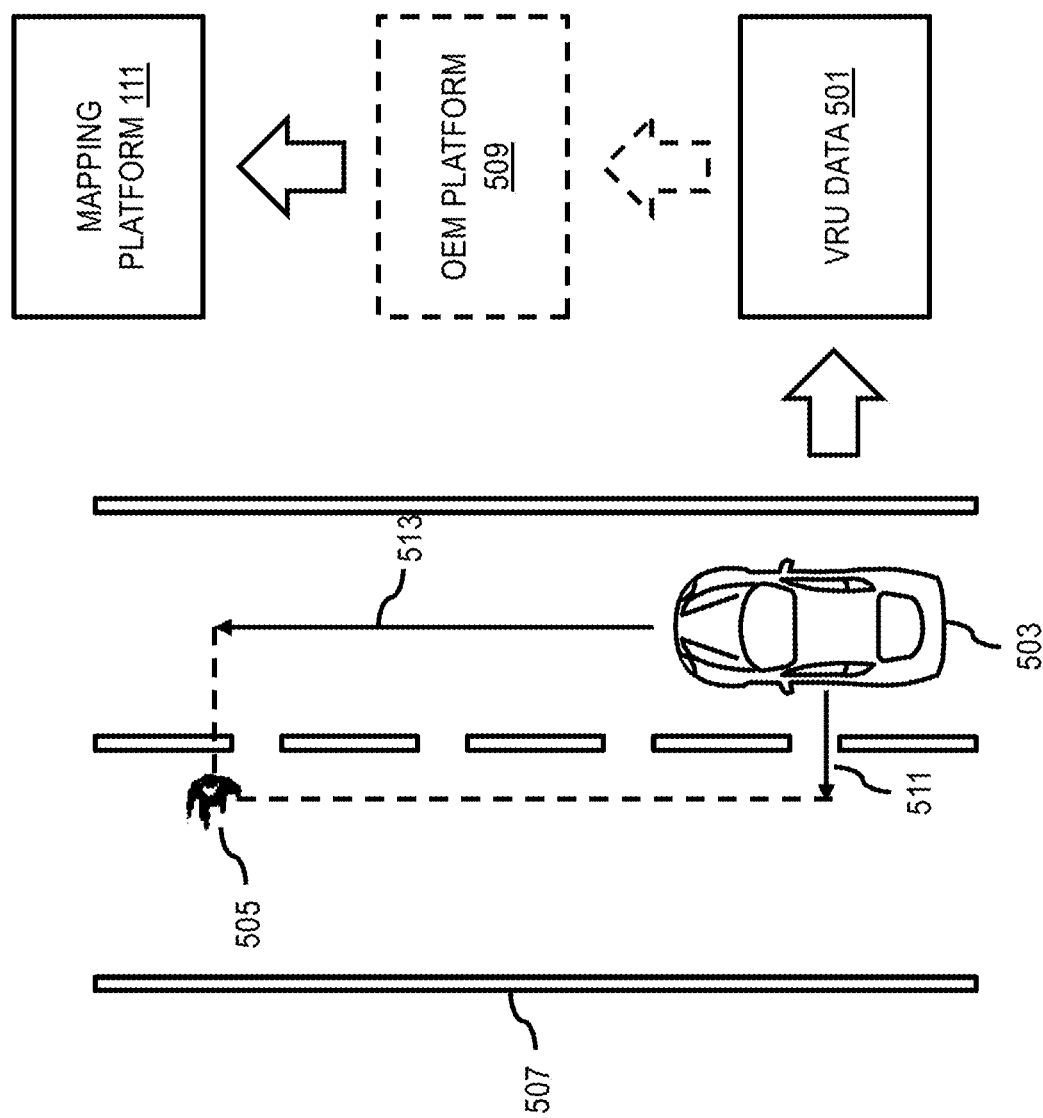
FIG. 5 is a diagram illustrating an example of collecting VRU data from vehicles, according to one embodiment.

FIG. 5 is a diagram illustrating an example of collecting VRU data from vehicles, according to one embodiment. In the example of FIG. 5, the mapping platform 111 collects VRU data (e.g., a detection of a VRU 505 (e.g., a moving person) on or near the roadway) from the vehicle 503 as the vehicle drives on a road link 507. The vehicle 503 detects a VRU 505 on or near the road link 507 on which the vehicle 503 is driving. By way of example, the VRU 505 is detected using a vehicle sensor capable of detecting a VRU (e.g., a camera, LiDAR sensor, radar sensor, infrared sensor, and/or any other equivalent sensor). As described above, the vehicle 503 can transmit the VRU data directly to the mapping platform 111, or first to an OEM platform 509 which then sends the VRU data to the mapping platform 111.

An example of the information that is collected by the vehicle 503 in real time via its sensors is shown below in Table 1.

TABLE 1

| Data Parameter | Type | Unit | Description |
|---|---|---|---|
| Number | Integer | VRU | The number of detected VRUs. |
| Timestamp | Integer | ms | The point in time when the VRUs were detected. For example, the timestamp can be generated by calling a Date_now( ) function in the Javascript context in the vehicle (or equivalent function). Under the Javascript context, the timestamp is returned, e.g., as the number of milliseconds elapsed since 1 Jan. 1970 00:00:00 UTC. |
| xDistance | Number | cm | Longitudinal distances to the detected VRUs from the vehicle 103 or vehicle sensor. |
| yDistance | Number | cm | Lateral distances to the detected VRUs from the vehicle 103 or vehicle sensor |

For example, with respect to the example of FIG. 5, the vehicle 503 can use its camera or other sensors to detect that there is one VRU 505 in the roadway (i.e., Number of VRUs=1) that has been detected at a time T (i.e., Timestamp=T ms) and located at a longitudinal offset from the vehicle 503 equal to the length of x-offset 511 (i.e., xDistance=x-offset 511 cm), a lateral offset from the vehicle 503 equal to y-offset 513 (i.e., yDistance=y-offset 415 cm). Alternatively, instead of reporting an offset location of the VRU, the actual location (e.g., latitude/longitude) of the observed VRU can reported. In one embodiment, the VRU module 115 of the vehicle 503 generates a VRU message containing the sensor data for transmission to the mapping platform 111 and/or OEM platform 509. VRU messages are generated, for instance, when the VRU module 115 determines that a trigger condition is meet (e.g., that a VRU or group of VRUs has been detected by the vehicle 503, that the detection meets a minimum confidence or probability threshold, etc.).

In one embodiment, based on Table 1 above, the VRU message can include but is not limited to the any combination of the following data fields: <Number>, <Timestamp>, <xDistance>, and <yDistance>. It is noted that expressing the detected location of the VRU 505 as an offset from the vehicle 503 is provided by way of illustration. It is contemplated that the detected location can be measured or reported using any location metric or system (e.g., an absolute location versus an offset location).

In one embodiment, because the reporting vehicles may originate from different manufacturers or OEMs, the format, data fields, units, etc. of the respective VRU messages may be different or proprietary to each manufacturer or OEM. Therefore, the collected VRU data can be different when collecting from multiple different vehicles. In this case, the data ingestion module 301 can normalize the formats, data fields, units, etc. of the different formats into a common format used by the mapping platform 111. This normalization can also include converting an offset distance to an absolute distance or vice versa.

In one embodiment, the data ingestion module 301 can pre-process the VRU data to further potentially invalid or erroneous VRU detections or data using one or more filtering criteria or rule. One example filtering rule can be used by the data ingestion module 301 to filter or remove VRU data with VRUs detected at a distance farther from the reporting vehicle than a known range of the detecting vehicle sensor. In other words, the data ingestion module 301 can filter the sensor data based on determining that the detected location is farther than a sensor range threshold of a sensor of the at least one vehicle used to collect the sensor data. For example, if a camera sensor has a known detection range of 1 km, this range can be set as the maximum detection threshold from the camera. In this way, if VRU messages reports the sensor type or the sensor type is otherwise known or assumed to be the camera (e.g., because the camera is set as the default detector), the data ingestion module 301 can determine the distance of the detected VRU from the vehicle using the reported VRU data and compare against the sensor range threshold. If the distance is greater than the sensor range threshold, the corresponding VRU message or sensor data is filtered from the VRU data. Then only the unfiltered remaining portion of the VRU data is used for further processing. Other example filtering rules can include filtering the VRU message or sensor data if the corresponding timestamp, xDistance, yDistance, or other reported data field is null or invalid (e.g., time is reported as a future time, out of sequence, etc.; or distances are too large).

In step 403, after collecting and/or optionally filtering the VRU data, the sensor data ingestion module 301 map matches the detected location(s) of the at least one VRUs to at least one road node, link, and/or segment thereof of a geographic database (e.g., the geographic database 107). For example, precise or absolute VRU locations (e.g., [latitude, longitude] coordinates) are determined from a combination of the xDistance and yDistance offsets and the vehicle's location. All unfiltered VRU locations in the collected VRU data are then map matched to map nodes, links, and/or segments in real time. It is contemplated that that the sensor data ingestion module 301 can use any type of map matcher known in the art to perform the map matching (e.g., a point-based map matcher). In one embodiment, the map matching can be specific to a road node, road link, a segment of the road link (e.g., 5-meter segments of the road), and/or a lane of the road link. In this way, the VRU can be associated with a particular road node, link, segment of the geographic database 107 and/or a travel lane of the road link. If map matching is performed to a lane level, then resulting VRU data can also be generated separately for each travel lane and road link or segment.

In one embodiment, the VRU locations are map matched to nodes, links, and/or segments that contain a physical divider (e.g., a guard rail or physical barrier that prevents the VRU from accessing the road). In addition or alternatively, the reporting vehicles can report physical divider detections as well as VRU detections as part of the collected sensor data and/or VRU messages. The vehicles can be equipped with any sensor (e.g., camera, LiDAR, radar, etc.) capable of detecting the presence of physical dividers. Accordingly, in one embodiment, the presence of physical dividers can be determined from map data (e.g., querying the geographic database 107) alone or in combination with sensor data (e.g., physical divider detections reported based on vehicle sensor data). The sensor data ingestion module 301 can then flag any VRU messages or sensor data that are map matched to road nodes, links, and/or segments containing physical dividers so that the VRU processing module 305 can set the VRU attribute value based on such map matching (e.g., by setting the VRU attribute to 0, LOW, or other any value that indicates the probability of a collision with a VRU is below a threshold value).

Figure 6A:
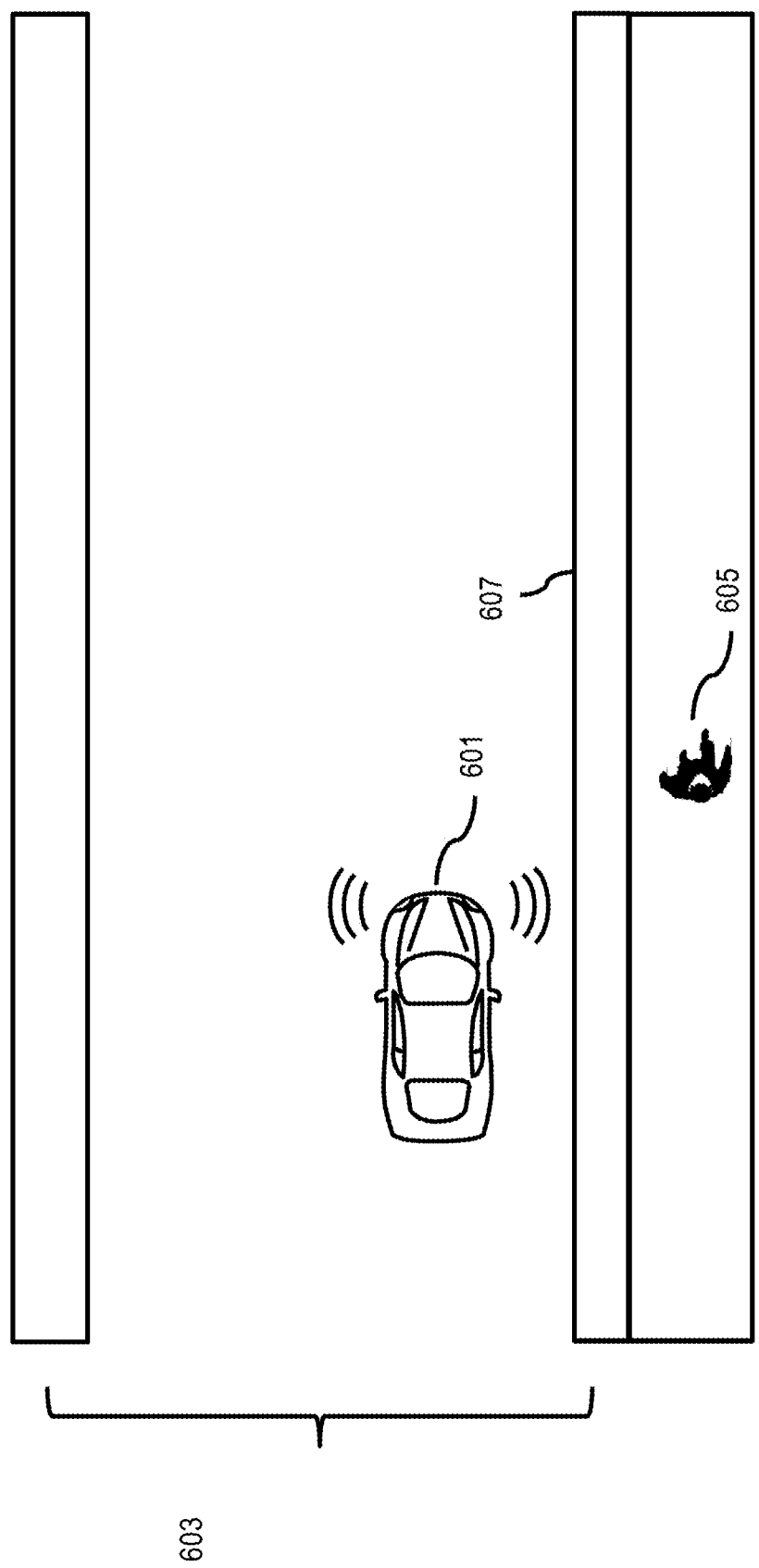
FIGS. 6A and 6B are diagrams illustrating an example of generating VRU data based on physical divider data, according to one embodiment.
Figure 6B:
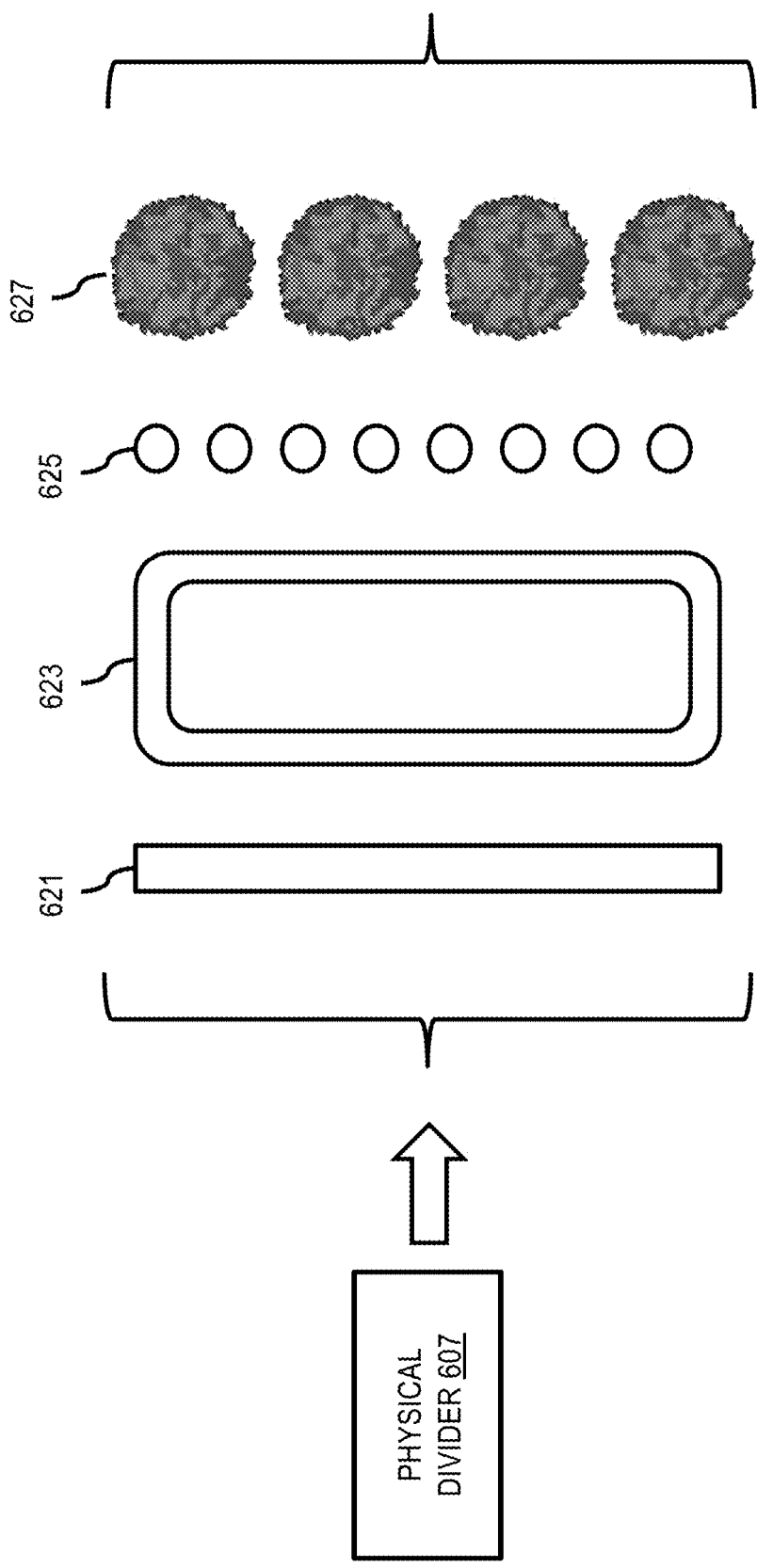

FIGS. 6A and 6B are diagrams illustrating an example of generating VRU data based on physical divider data, according to one embodiment. In this example, a vehicle 601 is traveling on a road segment 603 and detects the presence on a VRU 605 near the road 603. This VRU detection triggers the VRU module 115 of the vehicle 601 to generate and transmit a VRU message to the sensor data ingestion module 301 for processing. The VRU message for instance provides at least the detected location of the VRU 605 (e.g., a [lat, long] determined directly or as an offset distance from the vehicle 601). In addition, the VRU message can include a timestamp of the VRU detection. The sensor data ingestion module 301 can then map match the detected location to a road link of the geographic database 107, and then query the geographic database 107 to determine whether the map matched road link contains a physical divider 607.

FIG. 6B illustrates examples of physical dividers, according to one embodiment. As shown, a physical divider 607 can include, but is not limited to, (1) a solid wall 621 (e.g., a concrete barrier), (2) a median 623 that is sufficiently wide to separate reduce potential crossover traffic to a threshold probability, (3) a row of columns 625, (4) a row of trees 627, etc. It is noted that, in one embodiment, the physical divider 607 can be made of any type material or construction provided that it reduces, minimizes, or prevents potential crossover between vehicle lanes and VRU travel lanes, or otherwise minimizes a potential collision between vehicles and VRUs.

In the example of FIGS. 6A and 6B, the physical divider query returns a result indicating that the road segment 603 contains a physical divider 607 that separates the VRU 605 from the travel lane of the road segment 603. Because of this separation, the mapping platform 111 can configured to assume that the probability of a collision between a vehicle on the road segment and VRUs is low even when VRUs are detected near the road segment. In this way, the VRU attribute in the geographic database 107 for the road segment 603 can be set to LOW, 0, etc. even though the VRU 605 was detected nearby.

After data ingestion and map matching, in step 405, the VRU processing module 305 generates VRU data (e.g., VRU attributes for corresponding road node, link, and/or segment data records) to indicate a probability of the presence of at least one VRU on for the map matched road node, link, and/or segment data records. The VRU attributes are generated based on the sensor data and/or VRU messages collected from vehicles on the road node, link, and/or segment. In one embodiment, the VRU attribute indicates the probability of the presence of at least one VRU on a road node, link, and/or segment. As noted above, it is contemplated that the VRU attribute can use any metric or indicator to represent the probability. For example, the VRU attribute can represent a probability of the presence of a VRU normalized between a 0 and 1. Alternatively, the VRU attribute can be a binary attribute indicating a true condition or a false condition that the probability of the presence of the at least one vulnerable road user is high or low. In one embodiment, the VRU processing module 305 can apply a threshold value (e.g., a cut-off probability) that can be used to classify whether a calculated numerical probability of the presence of VRUs is in one of the binary VRU classification categories to set the VRU attribute value.

In one embodiment, the VRU processing module 305 generate the VRU attribute as an aggregate value for the road node, link, and/or segment. In addition or alternatively, VRU attributes can be generated per time epoch, per travel lane of the road link, and/or other any other contextual parameter (e.g., weather, vehicle type, other road link attributes—functional class, bi-directionality, etc.). For example, the presence of VRU attributes can vary according to time of day, day of the week, month, season, etc. Accordingly, the VRU messages or sensor data can be segmented according to designated time epochs so that respective VRU attributes values for each time epoch can be calculated for each road node, link, and/or segment. In another example, VRU presence or the potential for VRU collisions can vary based on lane position. For example, the lane closest to a side walk or other VRU travel lane (e.g., bicycle lane, bus lane, construction lane, etc.) may have greater VRU collision potential than lanes farther away. Accordingly, VRU attributes can be map matched at a lane level, so that the VRU attributes calculated separately for each lane of a road node, link, and/or segment. In one embodiment, multiple contextual parameters can be combined to segment the VRU data. For example, when both time and lane segmentation is desired, a VRU attribute value can be calculated for each time epoch for each lane of each road node, link, and/or segment.

In one embodiment, the VRU processing module 305 can use one or more VRU characteristics as a proxy for determining the probability of the presence of VRUs on a road node, link, and/or segment. For example, the VRU processing module 305 can calculate a total count of VRUs, an average count of VRUs, a VRU density on a node/link/segment, or a combination thereof as indicators of the probability of the presence of VRUs. In one embodiment, total VRU count can be determined as follows:

$$\text{Total } VRU \text{ count} = \sum_{i=1}^{n} \text{Number of detected } VRUs_i$$

where Number of detected VRUs is the <Number> field reported in each VRU message i for each road node, link, and/or segment (or road link/time epoch, road link/time epoch/lane, etc.)

In one embodiment, average VRU count can be determined as follows:

$$\text{Average } VRU \text{ count} = \frac{\text{total } VRU \text{ count}}{\text{Number of Unique Event IDs from Vehicles}}$$

wherein Number of Unique Event IDs from Vehicles is the number of unique VRU messages reporting the same detected VRU. In one embodiment, the VRU processing module 305 can aggregate multiple VRU messages that occur within a time threshold (e.g., within 1 minute) that include the same number of detected VRUs within the same proximity (e.g., an area by a designated radius from a centroid of locations of VRUs detected within the time threshold. The aggregated VRU messages are then grouped under a unique event ID.

In one embodiment, VRU density can be determined as follows:

$$\text{VRU density} = \frac{\text{Average VRU count}}{\text{Length of Road Link}}$$

where Length of Road Link is the length of the road node, link, and/or segment corresponding to the collected sensor data and/or VRU messages. The length of the road node, link, and/or segment, for instance, can be queried from the geographic database 107.

In one embodiment, the VRU processing module 305 can also create spatial and temporal data patterns from the VRU attributes. The VRU patterns, for instance, can capture the changes in VRU attribute values over a period of time. In one embodiment, the VRU processing module 305 segments the VRU sensor data into a plurality of time epochs based on the detection time as described above. VRU attributes are then generated for each of the time epochs for each road node, link, and/or segment. In other words, the VRU patterns (e.g., VRU statistics) are computed per node/link/segment for each time epoch. In one embodiment, the time epoch can be a 15-minute time epoch covering a 24-hour day to provide 96 epochs for each node, link, and/or segment. The first epoch, for instance, would be epoch 0 covering 12:00 to 12:15 am. It is noted that a 15-minute time epoch is provided by way of illustration and not as a limitation, and it is contemplated that the time epoch can be of any duration and cover any time period (e.g., day, week, month, season, year, etc.).

For each given road node, link, and/or segment in the geographic database 107 (e.g., identified according to a road link ID such as link ID=4573727), the VRU processing module 305 determines the VRU attributes (e.g., average VRU count and VRU density (e.g., as described above)) for the node/link/segment for each time epoch. In one embodiment, the VRU attributes for the road node, link, and/or segment over the time epochs represent the VRU pattern for the road node, link, and/or segment. By way of example, the VRU attributes for each time epoch can be stored as a VRU pattern data object or record in the geographic database 107.

Examples of VRU patterns are illustrated in Table 2 below:

TABLE 2

| Link ID | Time epoch | Average VRU Count | VRU Density | VRU High |
|---|---|---|---|---|
| 453757 | 4:00 to 4:15 am | 4 | 0.003 | False |
| 453757 | 9:15 to 9:30 am | 193 | 0.3214 | True |
| ... | ... | ... | ... | ... |
| 362198 | 9:30 to 9:45 am | 304 | 0.3595 | True |
| 743752 | 9:15 to 9:30 am | 1757 | 0.717 | True |

In one embodiment, the VRU patterns (e.g., as illustrated in Table 2) can be periodically computed (e.g., every month) using a sliding window across time (e.g., a 1-month window, 1-week window, etc.) where more recent VRU data is considered and older VRU older data is pruned when calculating the VRU attribute and/or VRU patterns. As shown in Table 2, the "VRU High" attribute is a binary data field that indicates whether the probability of the presence of VRUs on the road node/link/segment, time epoch, lane, etc. is greater than a threshold probability. In one embodiment, the VRU High attribute can be determined using the "VRU density" attribute as a proxy. Accordingly, VRU High can be determined by taking a cut on the VRU density. For example, if the VRU density is greater than the cut or threshold value (e.g., >0.15), the VRU High value is set to true. Otherwise, the VRU High value is set to false.

In one embodiment, the cut or threshold value used for determining the VRU High value can be a default value or determined from ground truth data. The ground truth data can include data on road links with known VRU attributes and known VRU probabilities. The cut or threshold value can then be determined based on maximizing classification accuracy as gauged by the ground truth data. In one embodiment, the VRU processing module 305 can also use a machine learning classifier or model to determine the VRU High attribute values and/or the cut value for assigning the VRU High attribute values.

In one embodiment, the mapping platform 111 can also determine VRU attributes for road links based on map data in addition or as an alternate to the sensor-data approaches described above. Accordingly, in step 407, the map data module 303 can optionally generate the VRU attributes for road links from map data. In other words, VRU presence can be determined independently of vehicle sensor data. For example, the map data module 303 process map data for one or more road links to identify at least one map feature indicative of the presence of VRUs.

Figure 7:
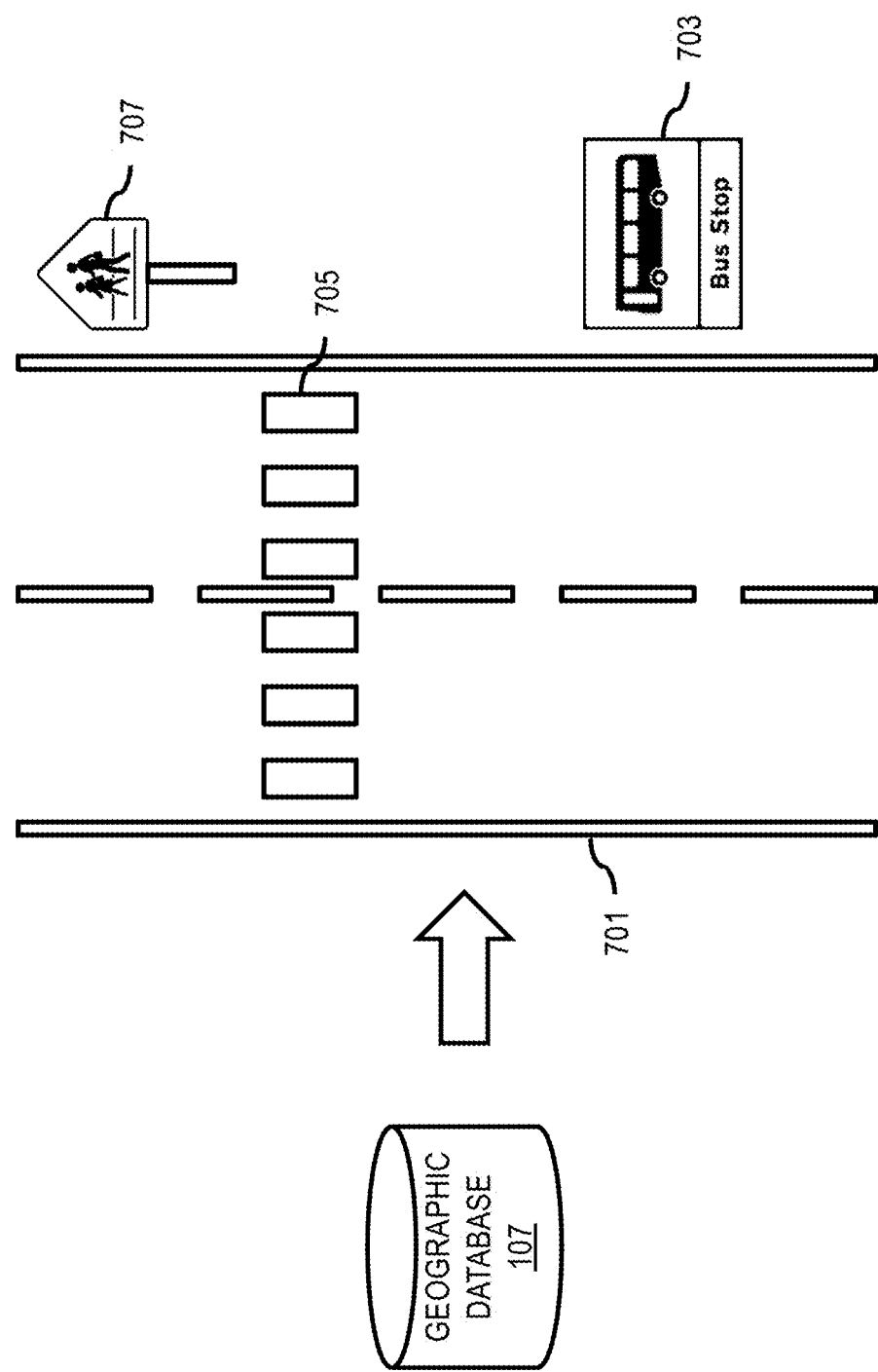
FIG. 7 is a diagram illustrating an example of generating VRU data based on map data, according to one embodiment.

FIG. 7 is a diagram illustrating an example of generating VRU data based on map data, according to one embodiment. In the example of FIG. 7, the map data module 303 queries the geographic database to determine whether a road link 701 contains VRU-related map feature. These map features are places or objects where VRUs have been observed or are known to be present such as but not limited to bus stops 703, pedestrian crosswalks 705, VRU-related signage 707 (e.g., school zone, animal crossing, etc.). If the map data module 303 determines that a road link contains VRU-related map features, the VRU attribute for that road link can be set to indicate that VRUs may be present on the road link above a probability threshold.

In one embodiment, the mapping platform 111 can use sensor data alone or in combination with map data to generate VRU attributes. For example, for road links that have no reported sensor data or VRU messages, the mapping platform 111 can use map data to populate VRU attribute fields for the corresponding road links. As sensor data becomes available or are collected for those road links, the mapping platform 111 can replace the map data-derived VRU attribute values with values generated from the sensor data.

In step 409, the data publication module 307 stores the VRU attributes and/or patterns generated according to the embodiments described above in the geographic database 107 as an attribute of the corresponding road link data record. In one embodiment, the data publication module 307 can store and/or publish the VRU data of the geographic database 107 as a VRU data layer 109 of the geographic database 107. The VRU data layer 109, for instance, segregates the VRU into separate data structures or layers from the underlying geographic topology data while maintaining links to the underlying topology to relate the VRU data layer 109 to features of the digital map.

In one embodiment, the mapping platform 111 collects, filters, and processes the collected sensor data and/or VRU messages in real-time. This real-time collection enables the VRU data layer 109 to also be created in real time to provide update-to-date VRU data to end users. It is noted that real time refers to generating the VRU data layer 109 or VRU data without the system 100 introducing delay beyond the time needed for processing, transmitting, storing, etc. the sensor data to produce the VRU data layer 109. The VRU data layer 109 can then be transmitted directly from the data publication module 307 to end user vehicles or transmitted to an OEM platform that can then relay the VRU data layer 109 to end user vehicles.

Figure 8:
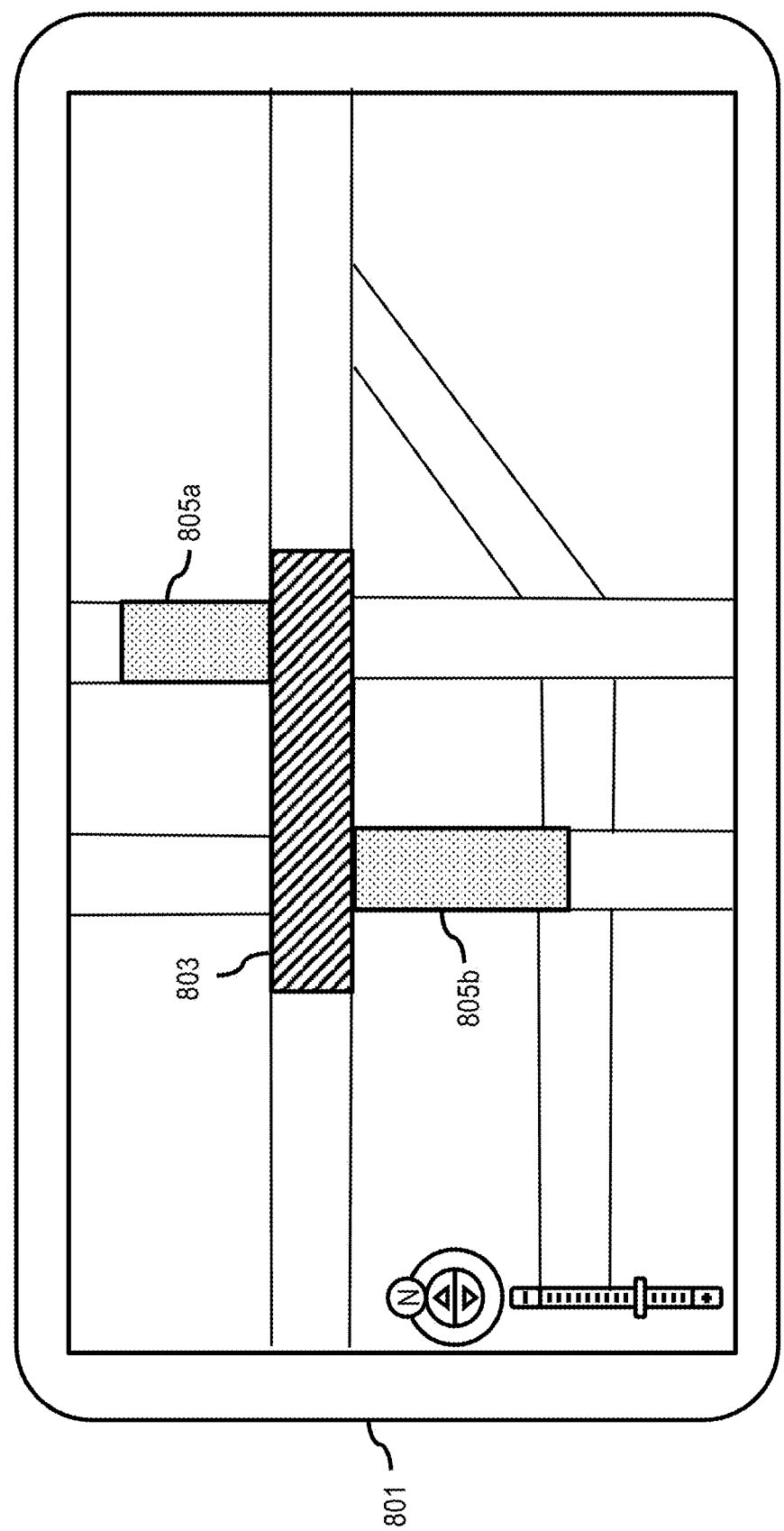
FIG. 8 is a diagram of an example user interface for presenting VRU data, according to one embodiment.

In one embodiment, the VRU data generated by the mapping platform 111 can be used for a variety of uses cases. For example, the VRU data can be used to present a mapping user interface indicating the presence of VRUs on various road links of the geographic database 107. FIG. 8 is a diagram of an example user interface for presenting VRU data, according to one embodiment. In this example, a user interface (UI) 801 is generated for a user device (e.g., a vehicle navigation device, mobile device, etc.) that presents a map depicting road nodes, links, and/or segments in a geographic area. VRU data from the geographic database 107 or the VRU data layer 109 is queried to determine the VRU densities on the road links in the UI 801. Based on this query, the UI 801 renders the road link 803 in a darker shade to indicate that VRU density is classified as high (e.g., above a maximum threshold), and renders links 805a and 805b in a lighter shade to indicate that the VRU density is classified as low (e.g., below the maximum threshold but above a lower threshold). The remaining nodes, links, and/or segments are presented with no shading to indicate that their VRU densities are low (e.g., below the lower threshold).

Other example embodiments of use cases for the VRU data are described below with respect to FIGS. 9-14.

Figure 9:
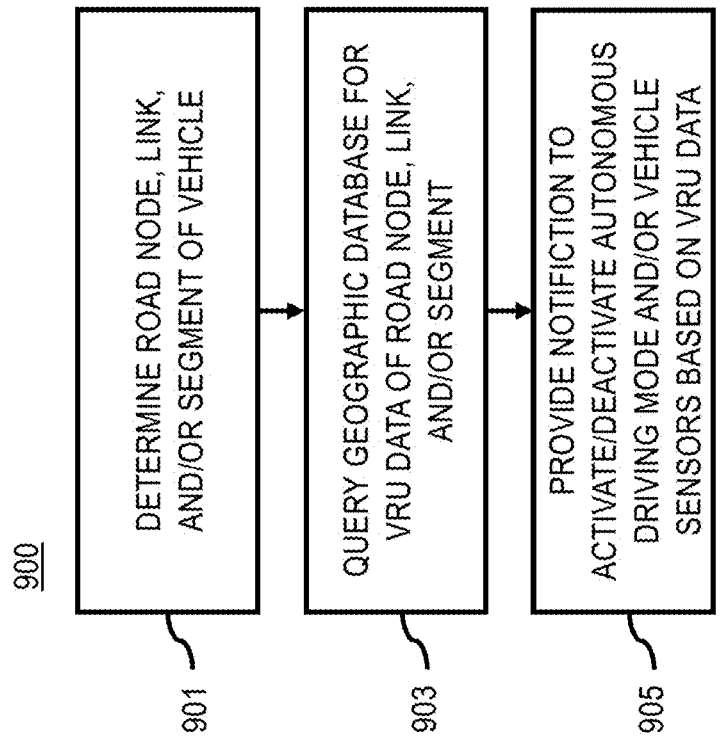
FIG. 9 is a flowchart of a process for operating a vehicle based on VRU data, according to one embodiment.

FIG. 9 is a flowchart of a process for operating a vehicle based on VRU data, according to one embodiment. In various embodiments, the mapping platform 111, VRU module 115, and/or any of the modules 301-311 may perform one or more portions of the process 900 and may be implemented in, for instance, a chip set including a processor and a memory as shown in FIG. 17. As such, mapping platform 111, VRU module 115, and/or any of the modules 301-311 can provide means for accomplishing various parts of the process 900, as well as means for accomplishing embodiments of other processes described herein in conjunction with other components of the system 100. Although the process 900 is illustrated and described as a sequence of steps, its contemplated that various embodiments of the process 900 may be performed in any order or combination and need not include all of the illustrated steps.

In this use case, a vehicle is equipped with a vehicle control module 309 capable of accessing VRU data as generated according to the embodiments described above. In step 901, the vehicle control module 309 determines a road link on which the vehicle is traveling or expects to travel. For example, the vehicle control module 309 can determine a current location (e.g., {lat, long]) using a location sensor (e.g., a GPS or other satellite-based location sensor) of the vehicle. The current location can then be map matched to the geographic database to identify the road node, link, segments, etc. (e.g., via a road link ID) as stored in the geographic database 107. To determine expected nodes/ links/segments, the vehicle control module 309 can determine a current navigation route being used to determine upcoming road nodes, links, and/or segments or otherwise predict upcoming routes based on historical travel data, context, nearest road links, etc.

In step 903, the vehicle control module 309 queries the geographic database 107 and/or VRU data layer 109 for VRU data (e.g., VRU attributes, VRU patterns, etc.) of the identified road nodes, links, and/or segments. In one embodiment, the querying of the geographic database further comprises determining that a time at which the vehicle is traveling or expects to travel on the road node/link/ segment lies within a time epoch associated with the retrieved VRU attribute.

In step 905, the vehicle control module 309 provides a notification to a driver or user to activate or deactivate an autonomous driving mode of the vehicle, a vehicle sensor of the vehicle, or a combination thereof while the vehicle travels on the road node, link, and/or segment based on determining that the retrieved VRU attribute meets a threshold criterion. In other words, using VRU data to operate a vehicle in one embodiment can include determining what autonomous driving mode to use or determining which vehicle sensor to use to enhance VRU detection. In one embodiment, in addition or as an alternate to providing a notification, the vehicle control module 309 can automatically (e.g., without user input) activate or deactivate an autonomous driving mode or vehicle sensor based on the VRU data.

With respect to autonomous driving, for instance, as a vehicle drives on a road link at time t, if the vehicle control module 309 determines that road link's VRU attribute is satisfies a threshold criterion, the vehicle control module 309 can select whether to operate or provide a notification to operate the vehicle in fully autonomous mode, semi-autonomous mode, or under manual control by the driver. To increase safety and reduce the potential for collisions between vehicles and VRUs, the vehicle control module 115 can engage or suggest a fully autonomous mode (e.g., no driver control needed and driver need not sit in the driver's seat) when the probability of the presence of VRUs is low, a semi-autonomous mode (e.g., vehicle still operates autonomously but driver is required to sit in the driver's seat, hold the steering, or otherwise be on alert to take full manual control) when the probability of the presence of VRUs is in medium probability range, and a manual mode (e.g., driver controls steering and braking) when the probability of the presence of VRUs is high based on the VRU data queried from the geographic database 107 and/or VRU data layer 109.

In one embodiment, the VRU attribute of interest can include an attribute indicating a density of VRUs on the road link (VRU density). Using, VRU density as an example, the vehicle control module 309 can select the driving mode of the vehicle based on VRU data as follows:

If (at time t, VRU density is high, e.g., >0.4), the vehicle control module 309 transitions the vehicle into manual driving mode;

If (at time t, VRU density is medium, e.g., >0.15 and <=0.4), the vehicle control module 309 transitions the vehicle into semi-autonomous driving mode; and If (at time t, VRU density is low, e.g., <=0.15), the vehicle control module 309 transitions the vehicle into fully-autonomous driving mode.

In other words, the threshold criterion used for the autonomous driving use case includes a first threshold value that indicates a probability of a presence of VRUs the traveled road link is greater than a first target probability. An autonomous driving mode is deactivated to transition the vehicle to a manual driving mode while traveling on the corresponding road link based on determining that the VRU attribute (e.g., VRU density) is greater than the first threshold value. In addition, the threshold criterion includes a second threshold value that indicates the probability of the presence of the vulnerable road user on the road link is less than the first target probability and greater than a second target probability. The autonomous driving mode is deactivated to transition the vehicle to a semi-autonomous driving mode while traveling on the road link based on determining that the VRU attribute is less than that first threshold greater than the second threshold value. Finally, the autonomous driving mode activated or maintained on the vehicle while traveling the road link based on determining that the VRU attribute is less than the second threshold value.

It is noted that the three driving modes (e.g., autonomous mode, semi-autonomous, manual, etc.) are provided by way of illustration and not as limitations. It is contemplated that the vehicle can support any number of autonomous driving modes. The vehicle, for instance, can be an autonomous vehicle or highly assisted driving vehicle that is capable of sensing its environment and navigating within a road network without driver or occupant input. It is noted that autonomous vehicles and highly assisted driving vehicles are part of a spectrum of vehicle classifications that can span from no automation to fully autonomous operation. For example, the U.S. National Highway Traffic Safety Administration ("NHTSA") in its "Preliminary Statement of Policy Concerning Automated Vehicles," published 2013, defines five levels of vehicle automation:

Level 0 (No-Automation)—"The driver is in complete and sole control of the primary vehicle controls—brake, steering, throttle, and motive power—at all times.";

Level 1 (Function-specific Automation)—"Automation at this level involves one or more specific control functions. Examples include electronic stability control or pre-charged brakes, where the vehicle automatically assists with braking to enable the driver to regain control of the vehicle or stop faster than possible by acting alone.";

Level 2 (Combined Function Automation)—"This level involves automation of at least two primary control functions designed to work in unison to relieve the driver of control of those functions. An example of combined functions enabling a Level 2 system is adaptive cruise control in combination with lane centering.";

Level 3 (Limited Self-Driving Automation)—"Vehicles at this level of automation enable the driver to cede full control of all safety-critical functions under certain traffic or environmental conditions and in those conditions to rely heavily on the vehicle to monitor for changes in those conditions requiring transition back to driver control. The driver is expected to be available for occasional control, but with sufficiently comfortable transition time."; and Level 4 (Full Self-Driving Automation)—"The vehicle is designed to perform all safety-critical driving functions and monitor roadway conditions for an entire trip. Such a design anticipates that the driver will provide destination or navigation input, but is not expected to be available for control at any time during the trip. This includes both occupied and unoccupied vehicles."

The various embodiments described herein are applicable to vehicles that are classified in any of the levels of automation (levels 0-4) discussed above. For example, in the case of autonomous modes of operation, the vehicle can automatically react to the presence of VRUs are indicated in the VRU data of the geographic database 107 and VRU data layer 109. Even in the case of completely manual driving (e.g., level 0), the vehicle can present an alert or notification when traveling on road links for which the VRU data indicates that VRUs are likely to be present to provide greater situational awareness and improve safety for drivers and VRUs.

Figure 10:
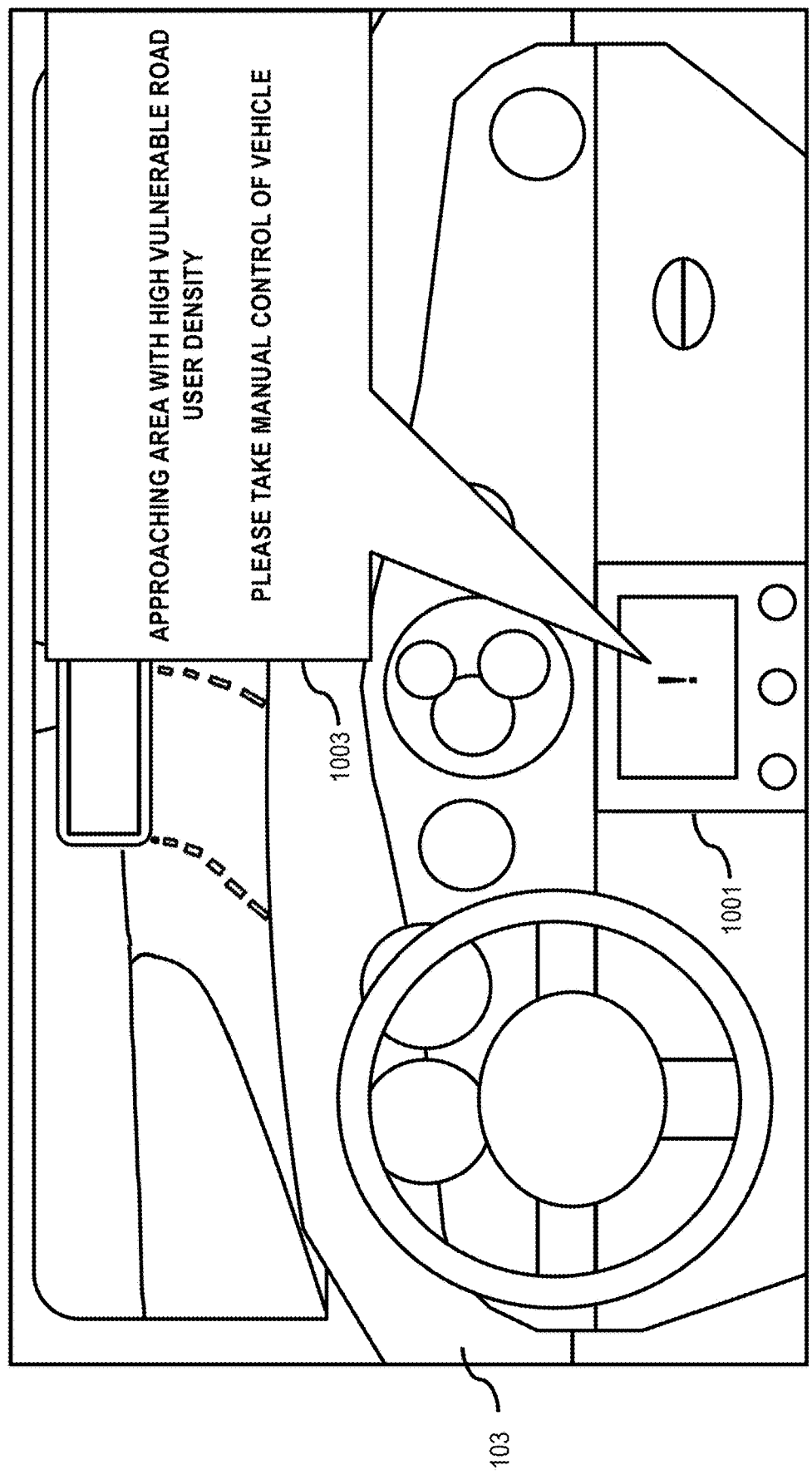
FIG. 10 is a diagram illustrating an example of activating/deactivating an autonomous driving mode of a vehicle based on VRU data, according to one embodiment.

FIG. 10 is a diagram illustrating an example of activating/deactivating an autonomous driving mode of a vehicle based on VRU data, according to one embodiment. In the example of FIG. 10, the vehicle 103 is traveling on a road segment that has been previously mapped for the presence of VRUs. This VRU data is stored in the geographic database 107 and/or VRU data layer 109 for access by the vehicle 103. The vehicle 103 also is currently operating in autonomous driving mode. As the vehicle 103 approaches the segment, the vehicle queries the geographic database for VRU data for the upcoming road segment. The query results indicate that upcoming road segment has a mapped VRU density of greater than a designated threshold value. The VRU data for upcoming road segment triggers the vehicle system 1001 (e.g., a VRU control module 115) to present an alert message 1003 to indicate that that the vehicle 103 is approaching an area with high VRU density and instructs the driver to take manual control for the segment. In addition, the vehicle system 1001 can deactivate the autonomous driving mode (e.g., following a period of time after presenting a notification such as the alert message 1003).

In addition to the autonomous driving use case, in one embodiment, the vehicle control module 309 can determine when to activate or deactivate vehicle sensors depending on whether the VRU attributes for a road link on which the vehicle is traveling or expects to travel meets a threshold criterion. For example, vehicles can be equipped with sensors ranging from simple and low-cost sensors (e.g., camera sensors, light sensors, etc.) to highly advanced and often very expensive sensors such as Light Imaging Detection and Ranging (LiDAR) sensors, Radio Detection and Ranging (radar), infrared sensors, and the like. In many cases, these sensors can generate large volumes of data, requiring significant computing resources to process. Because vehicles typically demand high reliability and redundancy for its components, including computing components, this high volume of sensor output data can overwhelm the resources available at the vehicle. In addition, many of advanced sensors (e.g., Lidar, Radar, etc.) have moving, retractable, or other parts that may be susceptible excessive wear and premature failure if used continuously. In other words, the vehicle sensor may include an advanced capability to detect the presence of VRUs on the road link at a performance level greater than another vehicle sensor. However, the vehicle sensor with the advanced capability is operated on demand for VRU detection to conserve resources while the other less-advanced vehicle sensor is operated continuously.

Accordingly, in one embodiment, the VRU data generated according to the embodiments described herein can be used to selectively activate or deactivate sensors based on whether the vehicle is driving on a road node, link, and/or segment with expected VRU presence. For example, as a vehicle drives a road link at time t, if the vehicle control module 309 determines that a corresponding VRU attribute (e.g., VRU density) is above a threshold value during the time epoch in which time t lies, the vehicle can automatically trigger advanced sensors such as LiDAR, infrared, radar, etc. instead of relying on less advance (and potentially less reliable sensors) such as a camera sensor to increase situational awareness and improve driver safety. Conversely, if the vehicle control module 309 determines that the corresponding VRU attribute is below the threshold value then the advanced sensors can be deactivated to conserve resources.

In other words, in a vehicle sensor activation/deactivation use case, the vehicle control module 309 can apply the threshold criterion on the queried VRU data. For example the criterion can include a threshold value for the VRU attribute that indicates the probability of the presence of VRUs on the road link is greater than a target probability. If the queried VRU attribute is greater than this threshold then the vehicle sensor is activated to detect the presence of VRUs while the vehicle is traveling the road link.

Figure 11:
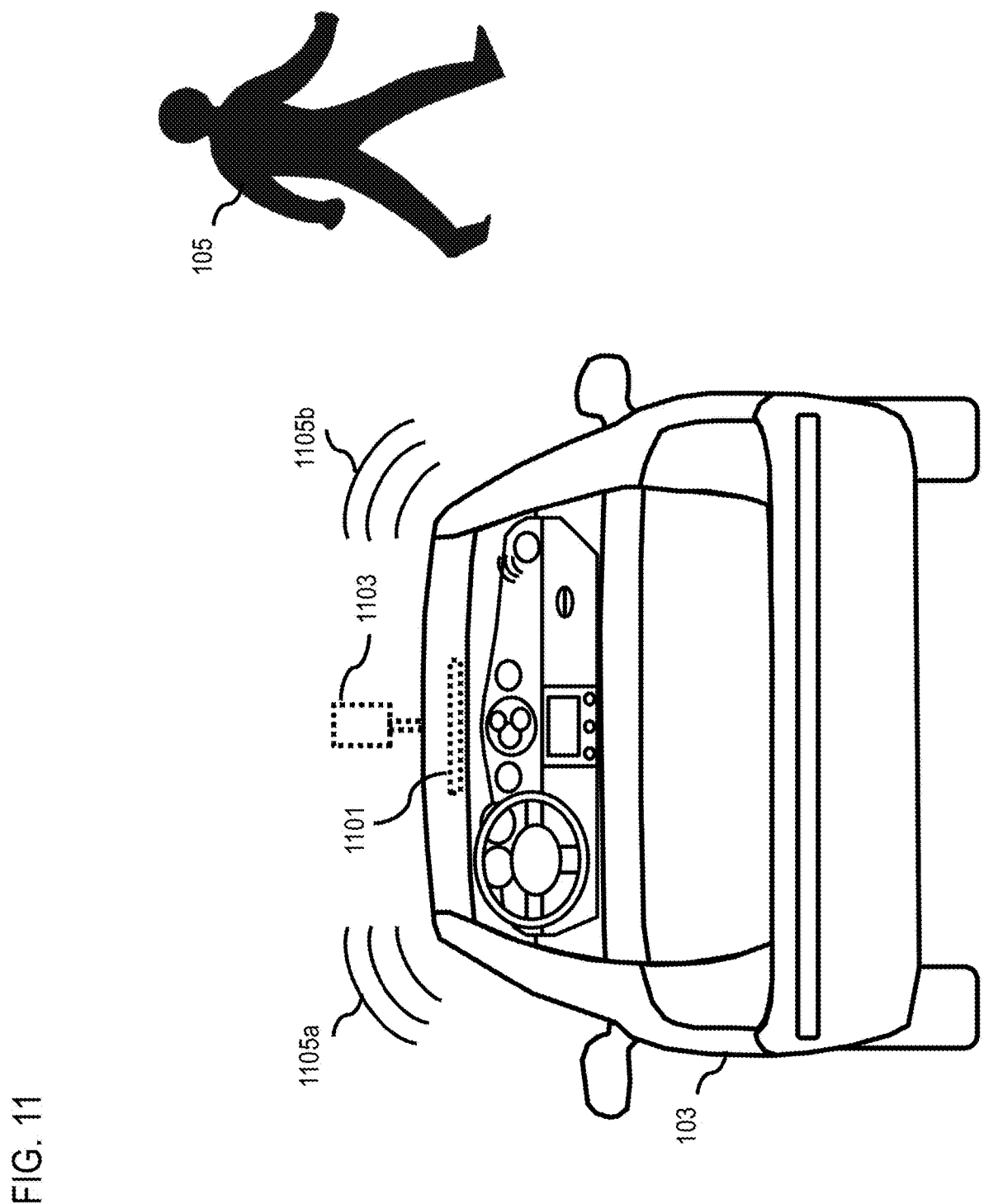
FIG. 11 is a diagram illustrating an example of activating/deactivating vehicle sensors based on VRU data, according to one embodiment.

FIG. 11 is a diagram illustrating an example of activating/deactivating vehicle sensors based on VRU data, according to one embodiment. As shown, the vehicle 103 is equipped with a camera sensor 1101, a LiDAR sensor 1103, and infrared sensors 1105a and 1105b (also collectively referred to as infrared sensors 1105). The LiDAR sensor 1103 and the infrared sensors 1105 are examples of the advanced sensors as described above. In a normal mode of operation, the camera sensor 1101 is operated continuously as the vehicle travels to detect VRUs at lower performance levels than the advanced sensors. Under this normal mode, the LiDAR sensor 1103 and infrared sensors 1105 are deactivated until the VRU data indicates that the vehicle 103 is traveling on a road link with a high probability of VRU presence (e.g., presence of VRU 105).

In one embodiment, the mapped VRU data can substitute from sensor data when one or more of the vehicle sensors fail or the vehicle does not have VRU detection sensors. In this case, the vehicle control module 309 can determine that the vehicle is not equipped with a VRU-detection sensor, that the VRU-detection sensor is not functioning, or a combination thereof. Based on this determination, the vehicle control module 309 can instead estimate the presence of VRUs on the road link based on the VRU attributes queried from the geographic database 107 and/or VRU data layer 109.

Figure 12:
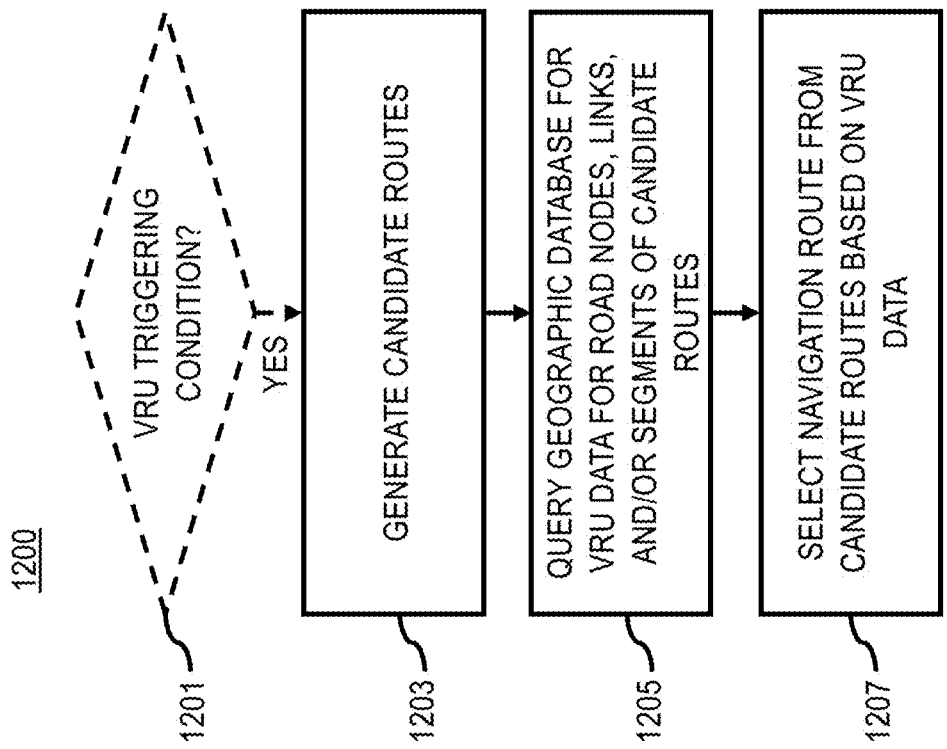
FIG. 12 is a flowchart of a process for determining a navigation route based on VRU data, according to one embodiment.

In yet another use case, the mapping platform can use the VRU data for generating navigation routes between an origin and a destination (e.g., to minimize potential exposure to VRUs along a route). FIG. 12 is a flowchart of a process for determining a navigation route based on VRU data, according to one embodiment. In various embodiments, the mapping platform 111, VRU module 115, and/or any of the modules 301-311 may perform one or more portions of the process 1200 and may be implemented in, for instance, a chip set including a processor and a memory as shown in FIG. 17. As such, mapping platform 111, VRU module 115, and/or any of the modules 301-311 can provide means for accomplishing various parts of the process 1200, as well as means for accomplishing embodiments of other processes described herein in conjunction with other components of the system 100. Although the process 1200 is illustrated and described as a sequence of steps, its contemplated that various embodiments of the process 1200 may be performed in any order or combination and need not include all of the illustrated steps.

In one scenario, a vehicle or driver may request a route that minimizes exposure to the potential presence of VRUs along the route. For example, autonomous vehicles may be configured to favor routes where there is less potential to collide with VRUs so that the vehicles can remain in fully autonomous mode longer or for the entire trip. It is contemplated that there may be also be any number of triggering conditions that can initiate a request for a route that minimizes VRU presence. For example, a vehicle may detect that one or more of its sensors (e.g., camera, LiDAR, infrared, radar, etc.) has failed, thereby reducing the vehicles capability to detect VRUs. As a result, the vehicle may request a navigation route with minimal VRU presence. In another example, a vehicle detects that one or more road conditions or events may make potential VRU collisions more likely (e.g., slippery pavement due to oil spill or black ice, visibility reduced due to fog or heavy rain, etc.). Accordingly, the vehicle may request a route that minimizes the VRU presence.

Figure 13:
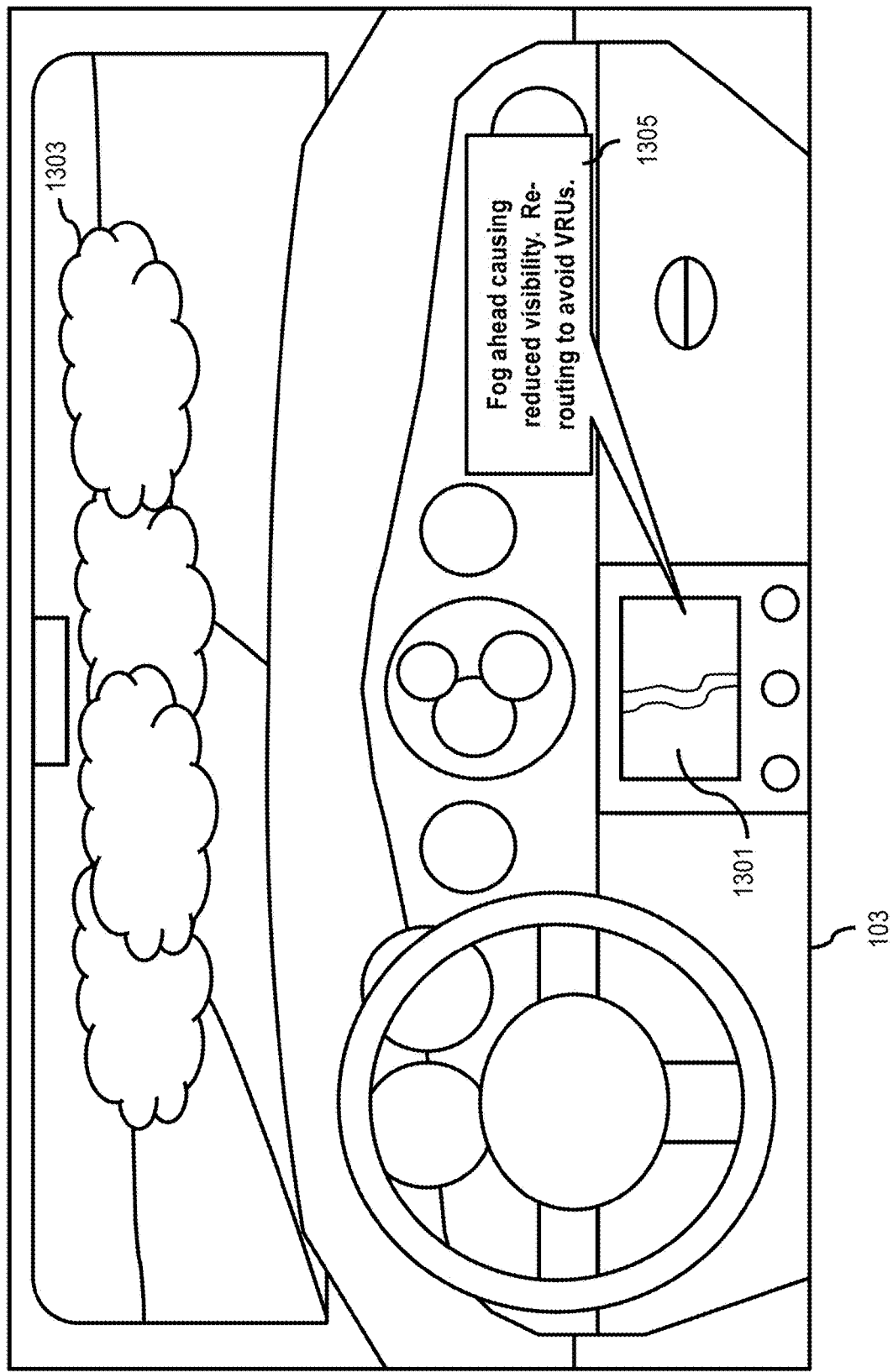
FIG. 13 is a diagram illustrating an example of initiating VRU-dependent route calculation based on a triggering condition, according to one embodiment.

FIG. 13 is a diagram illustrating an example of initiating VRU-dependent route calculation based on a triggering condition, according to one embodiment. In the example of FIG. 13, a vehicle 103 is driving on a road segment. The vehicle system 1301 detects that there is fog 1303 in the upcoming road segment that affects visibility, thereby making it more difficult for the driver to see and avoid any VRUs that may be on or near the upcoming road segment. To mitigate this condition, the system 1301 initiates a re-routing of the vehicle 103 to minimize traveling on road links with potential VRU presence. The system 1301, for instance, presents an alert message 1305 that indicates "Fog ahead causing reduced visibility. Re-routing to avoid VRUs."

In summary, in one embodiment, the routing module 311 of the mapping platform 111 may initiate the determining a VRU-dependent navigation route based one detecting one or more triggering conditions (step 1201). For example, the routing module 311 may initiate the routing based on determining that one or more sensors capable of detecting a vulnerable road user is not operating or not equipped on the vehicle, detecting an occurrence a road event, a road condition, or a combination thereof. These triggering road events, road conditions, etc. (e.g., slippery road conditions, reduced visibility, etc.) can be associated with an increase in a VRU accident rate above a threshold value. In one embodiment, detecting a triggering condition can be optional. In this case, the routing module 311 can skip optional step 1201 and begin the process 1200 at step 1203.

In step 1203, the routing module 311 generates one or more candidate navigation routes for a vehicle. The routing module 311, for instance, may receive a request for a route between an origin (or current location of the vehicle) and a destination, and then generate one or more candidate routes between the origin and destination using any navigation routing engine known in the art. The routing module 311 can use any means to identify the destination such as but not limited to: user input via a navigation system, calendar information, prediction from user history, etc. In one embodiment, if lane level information is available, the candidate routes can also include lane level routing guidance. The candidate routes, for instance, can contain a sequence of road nodes, links, and/or segments that are to be traveled.

In step 1205, the routing module 311 queries the geographic database 107 and/or VRU data layer 109 for VRU data for a respective set of road nodes, links, and/or segments comprising each of the one or more candidate navigation routes. By way of example, the VRU data (e.g., VRU attributes) includes but is not limited a VRU density, average VRU count, VRU classification (e.g., VRU presence high or low), or a combination thereof. In one embodiment, the routing module 311 can consider the timing of the navigation route (e.g., start time of the route, time at each road link in the route, etc.) to query for the VRU data from the corresponding time epochs. If, for instance, the vehicle is expected to drive on the first road node, link, and/or segment of a candidate route at a time t, the routing module 311 can query the VRU data from a time epoch in which the time t lies. Then the timing for each subsequent road node, link, and/or segment in the candidate route can be determined to query for the appropriate time epochs. The VRU query results can then be grouped according to each candidate route.

In one embodiment, the routing module 311 can also query the geographic database for a presence of one or more physical dividers on the respective set of road nodes, links, and/or segments for said each candidate navigation route. The presence of the one or more physical dividers can be used as a proxy for or in addition to the VRU user data for the selecting of the navigation route. For example, if a road node, link, and/or segment on a candidate route contains a physical divider (e.g., a physical divider as described above), the routing module 311 can designate the VRU attribute for road link as low or 0 probability for the purposes of route calculation and selection.

In step 1207, the routing module 311 selects the navigation route for the vehicle from among the one or more candidate navigation routes based on the VRU data. In one embodiment, the navigation route is selected to minimize a VRU attribute (e.g., VRU density) of the queried VRU data among the one or more candidate navigation routes. The routing module 311 can use, for instance, a cost-function or equivalent to minimize the probability of the presence of VRUs as indicated by the VRU attributes. For example, if the VRU attribute is density, the routing module 311 can sum the VRU densities for the set of road links in each candidate route to determine a respective VRU density sums. Then, the routing module 311 can select the candidate route with the lowest VRU density sum as the recommended route or route to configure on a vehicle. It is contemplated that the cost-function used to select a route can consider additional weighting factors or characteristics (e.g., functional class, vehicle type, average speed, and/or any other road attribute) when selecting a route based on VRU data. Although the embodiments above are discussed with minimizing the VRU presence, it is contemplated that any VRU presence criteria can be used for selection including finding a route that maximizes VRU presence, a route with a median VRU presence, etc.

Figure 14:
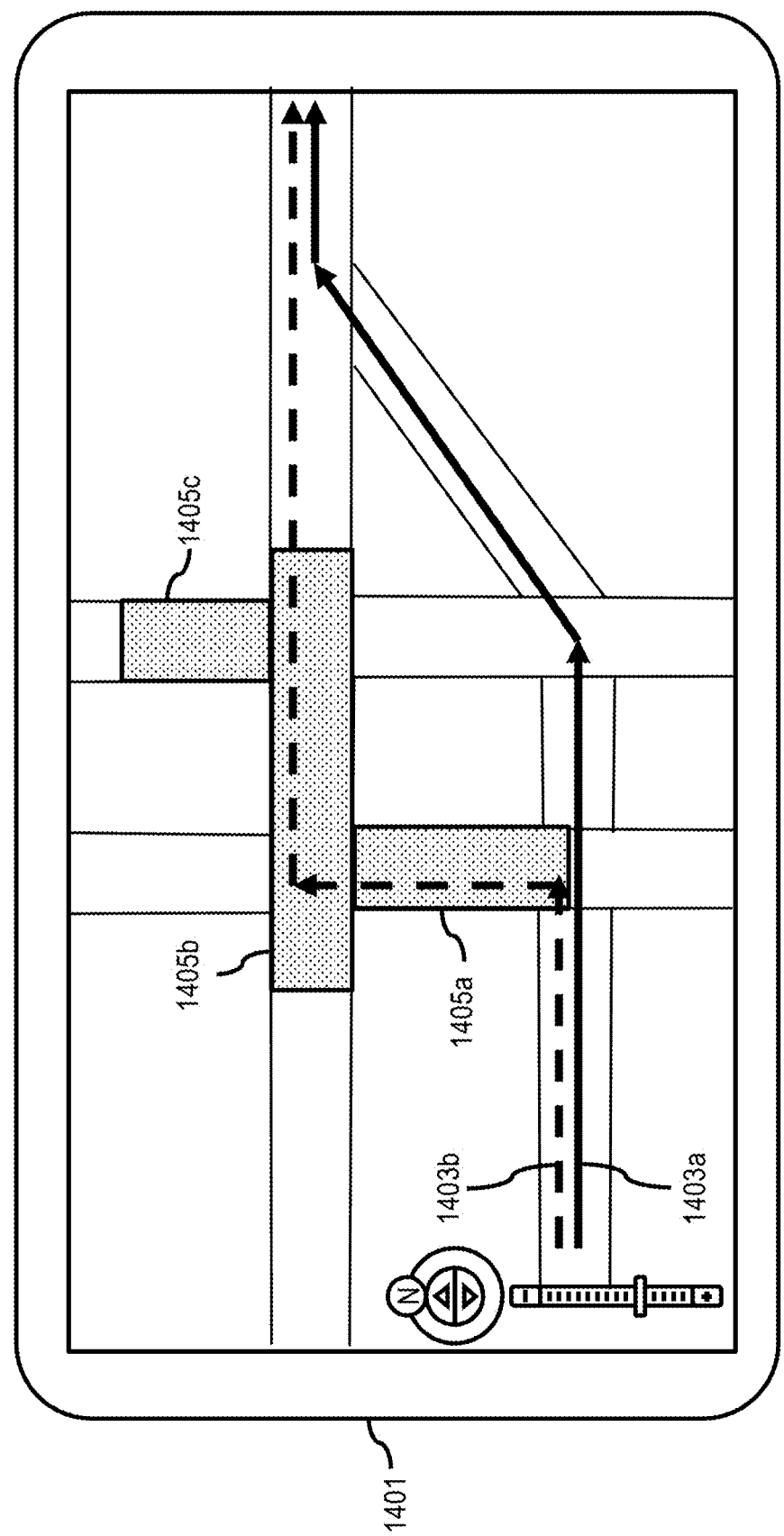
FIG. 14 is a diagram of an example user interface for presenting routing options based on VRU data, according to one embodiment.

In one embodiment, the routing module 311 can automatically use the selected route to configure an autonomous vehicle to drive the selected route. Alternatively, the route can be presented along with other candidate routes in a navigation user interface on a user device. FIG. 14 is a diagram of an example user interface for presenting routing options based on VRU data, according to one embodiment. As shown in the UI 1401, the mapping platform 111 has generated and evaluated at least two candidate routes 1403a and 1403b based on the VRU data for the road links in each route. The evaluation, for instance, is to minimize the use of road links with higher probabilities of VRU presence. In this example, the route 1403b includes or passes near at least three road links 1405a, 1405b, and 1405c that have mapped VRU attributes that are classified as high (e.g., VRU density above a threshold density) according to VRU data in the geographic database 107 and/or VRU data layer 109. In contrast, the route 1403a passes by only road link 1405a that has a high VRU presence as indicated by its VRU density. Accordingly, the minimum aggregate VRU density occurs on route 1405a. The mapping platform 1405a highlights the recommended route 1405a with a solid line and presents the route 1405b as an alternate route option indicated by a dotted line.

Returning to FIG. 1, in one embodiment, the mapping platform 111 has connectivity over a communication network 121 to the services platform 117 (e.g., an OEM platform) that provides one or more services 119 (e.g., sensor data collection services). By way of example, the services 119 may also be other third-party services and include mapping services, navigation services, travel planning services, notification services, social networking services, content (e.g., audio, video, images, etc.) provisioning services, application services, storage services, contextual information determination services, location-based services, information-based services (e.g., weather, news, etc.), etc. In one embodiment, the services platform 117 uses the output (e.g. physical divider predictions) of the mapping platform 111 to provide services such as navigation, mapping, other location-based services, etc.

In one embodiment, the mapping platform 111 may be a platform with multiple interconnected components. mapping platform 111 may include multiple servers, intelligent networking devices, computing devices, components and corresponding software for providing parametric representations of lane lines. In addition, it is noted that the mapping platform 111 may be a separate entity of the system 100, a part of the one or more services 119, a part of the services platform 117, or included within the vehicle 103 (e.g., a VRU module 115).

In one embodiment, content providers 123a-123m (collectively referred to as content providers 123) may provide content or data (e.g., including geographic data, parametric representations of mapped features, etc.) to the geographic database 107, the mapping platform 111, the services platform 117, the services 119, and the vehicle 103. The content provided may be any type of content, such as map content, textual content, audio content, video content, image content, etc. In one embodiment, the content providers 123 may provide content that may aid in the detecting and classifying of VRUs or other related characteristics (e.g., physical dividers). In one embodiment, the content providers 123 may also store content associated with the geographic database 107, mapping platform 111, services platform 117, services 119, and/or vehicle 103. In another embodiment, the content providers 123 may manage access to a central repository of data, and offer a consistent, standard interface to data, such as a repository of the geographic database 107.

By way of example, the VRU module 115 can be any type of embedded system, mobile terminal, fixed terminal, or portable terminal including a built-in navigation system, a personal navigation device, mobile handset, station, unit, device, multimedia computer, multimedia tablet, Internet node, communicator, desktop computer, laptop computer, notebook computer, netbook computer, tablet computer, personal communication system (PCS) device, personal digital assistants (PDAs), audio/video player, digital camera/camcorder, positioning device, fitness device, television receiver, radio broadcast receiver, electronic book device, game device, or any combination thereof, including the accessories and peripherals of these devices, or any combination thereof. It is also contemplated that the VRU module 115 can support any type of interface to the user (such as "wearable" circuitry, etc.). In one embodiment, the VRU module 115 may be associated with the vehicle 103 or be a component part of the vehicle 103.

In one embodiment, the vehicle 103 is configured with various sensors for generating or collecting VRU sensor data, vehicular sensor data, related geographic/map data, etc. In one embodiment, the sensed data represent sensor data associated with a geographic location or coordinates at which the sensor data was collected. In this way, the sensor data can act as observation data that can be separated into location-aware training and evaluation datasets according to their data collection locations as well as used for detecting physical dividers according to the embodiments described herein. By way of example, the sensors may include a radar system, a LiDAR system, a global positioning sensor for gathering location data (e.g., GPS), a network detection sensor for detecting wireless signals or receivers for different short-range communications (e.g., Bluetooth, Wi-Fi, Li-Fi, near field communication (NFC) etc.), temporal information sensors, a camera/imaging sensor for gathering image data, an audio recorder for gathering audio data, velocity sensors mounted on steering wheels of the vehicles, switch sensors for determining whether one or more vehicle switches are engaged, and the like.

Other examples of sensors of the vehicle 103 may include light sensors, orientation sensors augmented with height sensors and acceleration sensor (e.g., an accelerometer can measure acceleration and can be used to determine orientation of the vehicle), tilt sensors to detect the degree of incline or decline of the vehicle along a path of travel, moisture sensors, pressure sensors, etc. In a further example embodiment, sensors about the perimeter of the vehicle 103 may detect the relative distance of the vehicle from a VRU, a physical divider, a lane or roadway, the presence of other vehicles, pedestrians, traffic lights, potholes and any other objects, or a combination thereof. In one scenario, the sensors may detect weather data, traffic information, or a combination thereof. In one embodiment, the vehicle 103 may include GPS or other satellite-based receivers to obtain geographic coordinates from satellites for determining current location and time. Further, the location can be determined by visual odometry, triangulation systems such as A-GPS, Cell of Origin, or other location extrapolation technologies. In yet another embodiment, the sensors can determine the status of various control elements of the car, such as activation of wipers, use of a brake pedal, use of an acceleration pedal, angle of the steering wheel, activation of hazard lights, activation of head lights, etc.

In one embodiment, the communication network 121 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof.

By way of example, the mapping platform 111, services platform 117, services 119, vehicle 103, and/or content providers 123 communicate with each other and other components of the system 100 using well known, new or still developing protocols. In this context, a protocol includes a set of rules defining how the network nodes within the communication network 121 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 15:
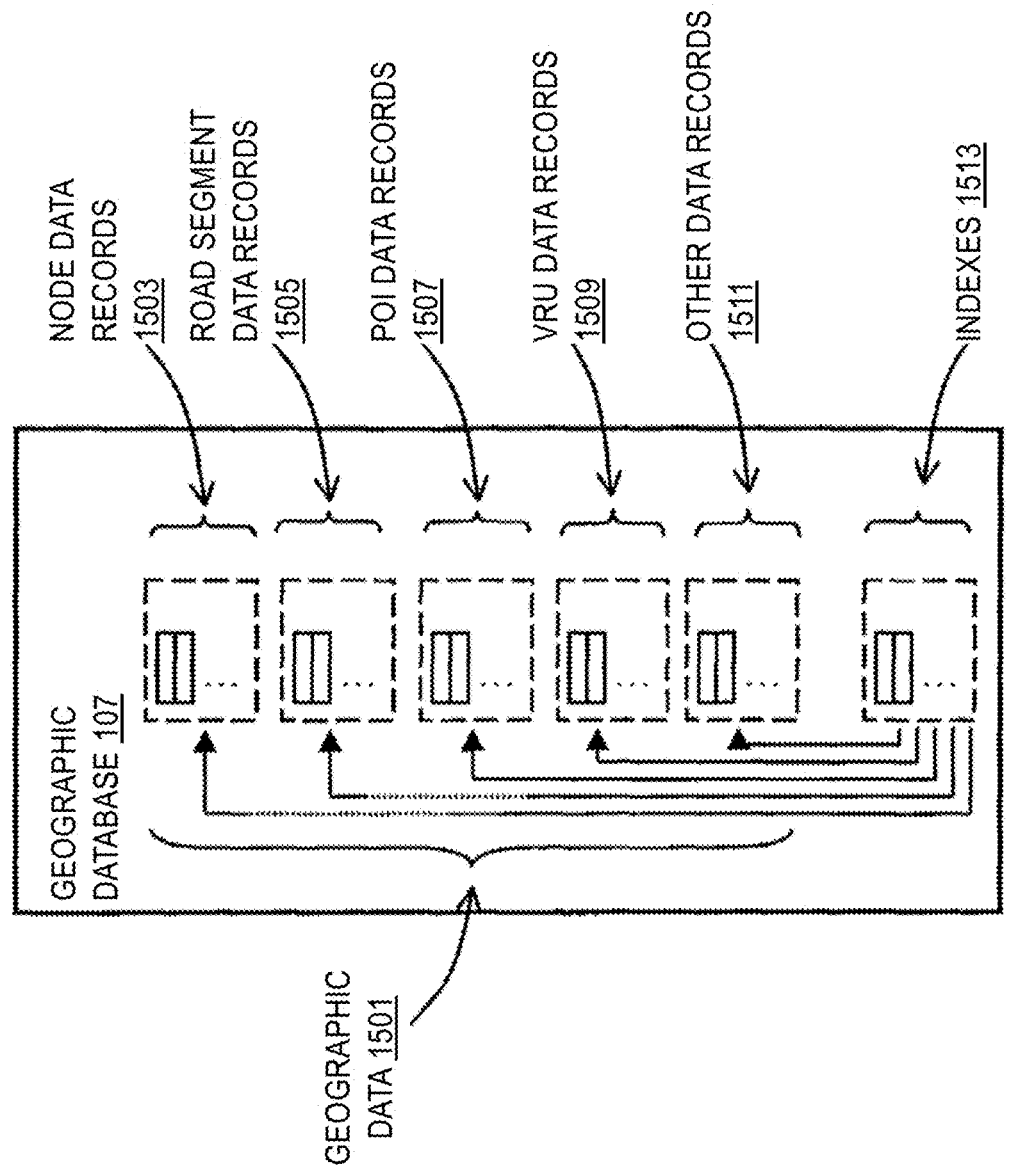
FIG. 15 is a diagram of a geographic database, according to one embodiment.

FIG. 15 is a diagram of a geographic database, according to one embodiment. In one embodiment, the geographic database 107 includes geographic data 1501 used for (or configured to be compiled to be used for) mapping and/or navigation-related services. In one embodiment, geographic features (e.g., two-dimensional or three-dimensional features) are represented using polygons (e.g., two-dimensional features) or polygon extrusions (e.g., three-dimensional features). For example, the edges of the polygons correspond to the boundaries or edges of the respective geographic feature. In the case of a building, a two-dimensional polygon can be used to represent a footprint of the building, and a three-dimensional polygon extrusion can be used to represent the three-dimensional surfaces of the building. It is contemplated that although various embodiments are discussed with respect to two-dimensional polygons, it is contemplated that the embodiments are also applicable to three-dimensional polygon extrusions. Accordingly, the terms polygons and polygon extrusions as used herein can be used interchangeably.

In one embodiment, the following terminology applies to the representation of geographic features in the geographic database 107.

"Node"—A point that terminates a link.

"Line segment"—A straight line connecting two points.

"Link" (or "edge")—A contiguous, non-branching string of one or more line segments terminating in a node at each end.

"Shape point"—A point along a link between two nodes (e.g., used to alter a shape of the link without defining new nodes).

"Oriented link"—A link that has a starting node (referred to as the "reference node") and an ending node (referred to as the "non reference node").

"Simple polygon"—An interior area of an outer boundary formed by a string of oriented links that begins and ends in one node. In one embodiment, a simple polygon does not cross itself.

"Polygon"—An area bounded by an outer boundary and none or at least one interior boundary (e.g., a hole or island). In one embodiment, a polygon is constructed from one outer simple polygon and none or at least one inner simple polygon. A polygon is simple if it just consists of one simple polygon, or complex if it has at least one inner simple polygon.

In one embodiment, the geographic database 107 follows certain conventions. For example, links do not cross themselves and do not cross each other except at a node. Also, there are no duplicated shape points, nodes, or links. Two links that connect each other have a common node. In the geographic database 107, overlapping geographic features are represented by overlapping polygons. When polygons overlap, the boundary of one polygon crosses the boundary of the other polygon. In the geographic database 107, the location at which the boundary of one polygon intersects they boundary of another polygon is represented by a node. In one embodiment, a node may be used to represent other locations along the boundary of a polygon than a location at which the boundary of the polygon intersects the boundary of another polygon. In one embodiment, a shape point is not used to represent a point at which the boundary of a polygon intersects the boundary of another polygon.

As shown, the geographic database 107 includes node data records 1503, road segment or link data records 1505, POI data records 1507, VRU records 1509, other records 1511, and indexes 1513, for example. More, fewer or different data records can be provided. In one embodiment, additional data records (not shown) can include cartographic ("cartel") data records, routing data, and maneuver data. In one embodiment, the indexes 1513 may improve the speed of data retrieval operations in the geographic database 107. In one embodiment, the indexes 1513 may be used to quickly locate data without having to search every row in the geographic database 107 every time it is accessed. For example, in one embodiment, the indexes 1513 can be a spatial index of the polygon points associated with stored feature polygons.

In exemplary embodiments, the road segment data records 1505 are links or segments representing roads, streets, or paths, as can be used in the calculated route or recorded route information for determination of one or more personalized routes. The node data records 1503 are end points corresponding to the respective links or segments of the road segment data records 1505. The road link data records 1505 and the node data records 1503 represent a road network, such as used by vehicles, cars, and/or other entities. Alternatively, the geographic database 107 can contain path segment and node data records or other data that represent pedestrian paths or areas in addition to or instead of the vehicle road record data, for example.

The road/link segments and nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database 107 can include data about the POIs and their respective locations in the POI data records 1507. The geographic database 107 can also include data about places, such as cities, towns, or other communities, and other geographic features, such as bodies of water, mountain ranges, etc. Such place or feature data can be part of the POI data records 1507 or can be associated with POIs or POI data records 1507 (such as a data point used for displaying or representing a position of a city).

In one embodiment, the geographic database 107 can also include VRU records 1509 for storing mapped or predicted VRUs, physical dividers, and/or other related road characteristics. The VRU data (e.g., VRU attributes such as VRU density, average VRU counts, VRU patterns, etc.), for instance, can be stored as attributes or data records of a VRU data layer 109, which fuses with the VRU attributes with map attributes or features. In one embodiment, the VRU records 1509 can be associated with segments of a road link (as opposed to an entire link). It is noted that the segmentation of the road for the purposes of mapping VRU data can be different than the road link structure of the geographic database 107. In other words, the segments can further subdivide the links of the geographic database 107 into smaller segments (e.g., of uniform lengths such as 5-meters). In this way, VRU attributes can be represented at a level of granularity that is independent of the granularity or at which the actual road or road network is represented in the geographic database 107. In one embodiment, the VRU records 1509 can be associated with one or more of the node records 1503, road segment records 1505, and/or POI data records 1507; or portions thereof (e.g., smaller or different segments than indicated in the road segment records 1505, individual lanes of the road segments, etc.) to provide situational awareness to drivers and provide for safer autonomous operation and routing of vehicles. In this way, the VRU data stored in the VRU records 1509 can also be associated with the characteristics or metadata of the corresponding record 1503, 1505, and/or 1507.

In one embodiment, the geographic database 107 can be maintained by the content provider 123 in association with the services platform 117 (e.g., a map developer). The map developer can collect geographic data to generate and enhance the geographic database 107. There can be different ways used by the map developer to collect data. These ways can include obtaining data from other sources, such as municipalities or respective geographic authorities. In addition, the map developer can employ field personnel to travel by vehicle along roads throughout the geographic region to observe features (e.g., VRU attributes, VRU patterns, etc.) and/or record information about them, for example. Also, remote sensing, such as aerial or satellite photography, can be used.

In one embodiment, the geographic database 107 include high resolution or high definition (HD) mapping data that provide centimeter-level or better accuracy of map features. For example, the geographic database 107 can be based on Light Detection and Ranging (LiDAR) or equivalent technology to collect billions of 3D points and model road surfaces and other map features down to the number lanes and their widths. In one embodiment, the HD mapping data capture and store details such as the slope and curvature of the road, lane markings, roadside objects such as sign posts, including what the signage denotes. By way of example, the HD mapping data enable highly automated vehicles to precisely localize themselves on the road, and to determine road attributes (e.g., learned speed limit values) to at high accuracy levels.

In one embodiment, the geographic database 107 is stored as a hierarchical or multilevel tile-based projection or structure. More specifically, in one embodiment, the geographic database 107 may be defined according to a normalized Mercator projection. Other projections may be used. By way of example, the map tile grid of a Mercator or similar projection is a multilevel grid. Each cell or tile in a level of the map tile grid is divisible into the same number of tiles of that same level of grid. In other words, the initial level of the map tile grid (e.g., a level at the lowest zoom level) is divisible into four cells or rectangles. Each of those cells are in turn divisible into four cells, and so on until the highest zoom or resolution level of the projection is reached.

In one embodiment, the map tile grid may be numbered in a systematic fashion to define a tile identifier (tile ID). For example, the top left tile may be numbered 00, the top right tile may be numbered 01, the bottom left tile may be numbered 10, and the bottom right tile may be numbered 11. In one embodiment, each cell is divided into four rectangles and numbered by concatenating the parent tile ID and the new tile position. A variety of numbering schemes also is possible. Any number of levels with increasingly smaller geographic areas may represent the map tile grid. Any level (n) of the map tile grid has $2(n+1)$ cells. Accordingly, any tile of the level (n) has a geographic area of $A/2(n+1)$ where A is the total geographic area of the world or the total area of the map tile grid 10. Because of the numbering system, the exact position of any tile in any level of the map tile grid or projection may be uniquely determined from the tile ID.

In one embodiment, the system 100 may identify a tile by a quadkey determined based on the tile ID of a tile of the map tile grid. The quadkey, for example, is a one-dimensional array including numerical values. In one embodiment, the quadkey may be calculated or determined by interleaving the bits of the row and column coordinates of a tile in the grid at a specific level. The interleaved bits may be converted to a predetermined base number (e.g., base 10, base 4, hexadecimal). In one example, leading zeroes are inserted or retained regardless of the level of the map tile grid in order to maintain a constant length for the one-dimensional array of the quadkey. In another example, the length of the one-dimensional array of the quadkey may indicate the corresponding level within the map tile grid 10. In one embodiment, the quadkey is an example of the hash or encoding scheme of the respective geographical coordinates of a geographical data point that can be used to identify a tile in which the geographical data point is located.

The geographic database 107 can be a master geographic database stored in a format that facilitates updating, maintenance, and development. For example, the master geographic database or data in the master geographic database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by the vehicle 103, for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

The processes described herein for mapping VRUs may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 16:
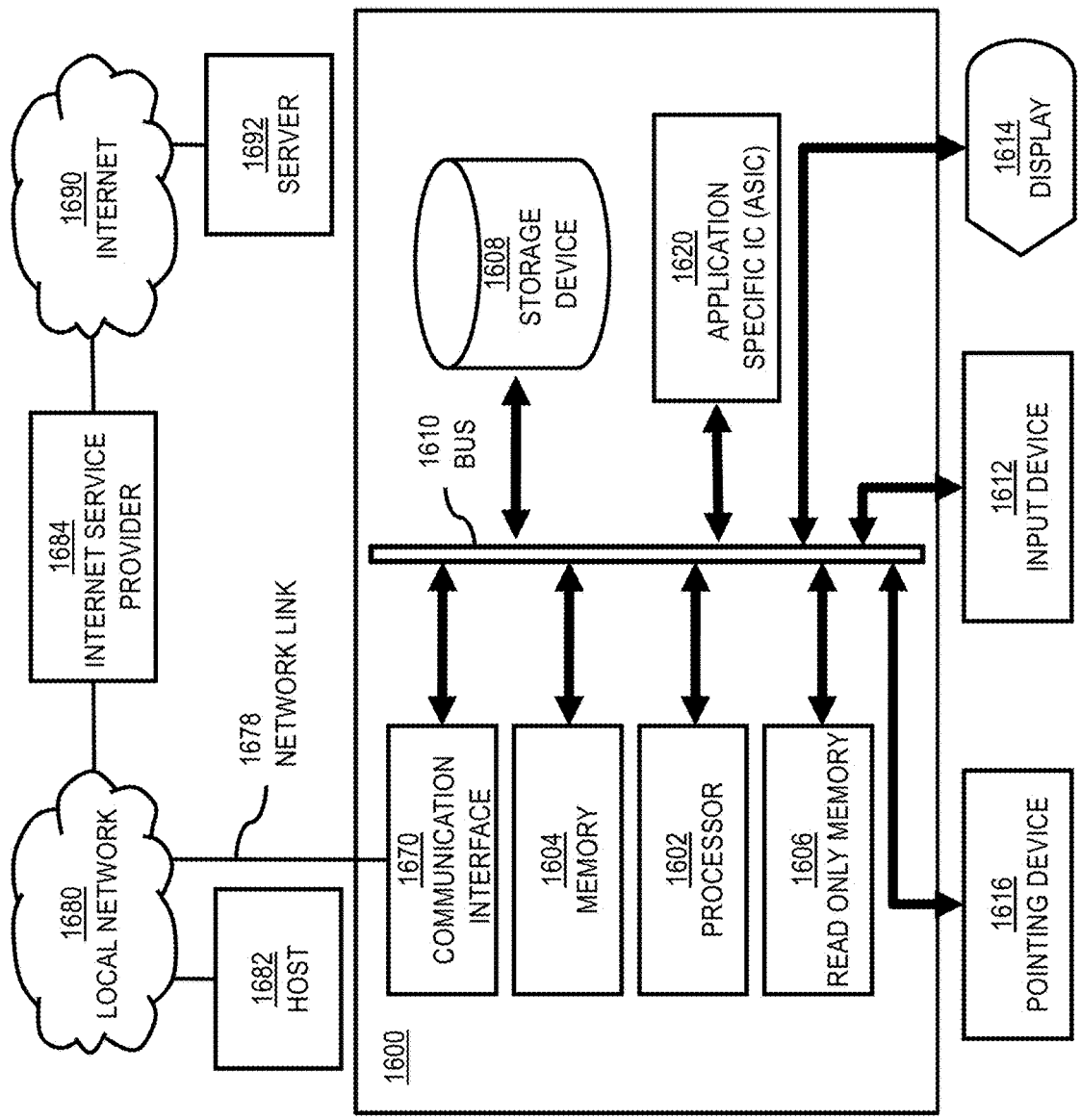
FIG. 16 is a diagram of hardware that can be used to implement an embodiment.

FIG. 16 illustrates a computer system 1600 upon which an embodiment may be implemented. Computer system 1600 is programmed (e.g., via computer program code or instructions) to map VRUs as described herein and includes a communication mechanism such as a bus 1610 for passing information between other internal and external components of the computer system 1600. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 1610 includes one or more parallel conductors of information so that information is transferred quickly among devices coupled to the bus 1610. One or more processors 1602 for processing information are coupled with the bus 1610.

A processor 1602 performs a set of operations on information as specified by computer program code related to mapping VRUs. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1610 and placing information on the bus 1610. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1602, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 1600 also includes a memory 1604 coupled to bus 1610. The memory 1604, such as a random access memory (RAM) or other dynamic storage device, stores information including processor instructions for mapping VRUs. Dynamic memory allows information stored therein to be changed by the computer system 1600. RAM allows a unit of information stored at a location called a memory address to be stored and retrieved independently of information at neighboring addresses. The memory 1604 is also used by the processor 1602 to store temporary values during execution of processor instructions. The computer system 1600 also includes a read only memory (ROM) 1606 or other static storage device coupled to the bus 1610 for storing static information, including instructions, that is not changed by the computer system 1600. Some memory is composed of volatile storage that loses the information stored thereon when power is lost. Also coupled to bus 1610 is a non-volatile (persistent) storage device 1608, such as a magnetic disk, optical disk or flash card, for storing information, including instructions, that persists even when the computer system 1600 is turned off or otherwise loses power.

Information, including instructions for mapping VRUs, is provided to the bus 1610 for use by the processor from an external input device 1612, such as a keyboard containing alphanumeric keys operated by a human user, or a sensor. A sensor detects conditions in its vicinity and transforms those detections into physical expression compatible with the measurable phenomenon used to represent information in computer system 1600. Other external devices coupled to bus 1610, used primarily for interacting with humans, include a display device 1614, such as a cathode ray tube (CRT) or a liquid crystal display (LCD), or plasma screen or printer for presenting text or images, and a pointing device 1616, such as a mouse or a trackball or cursor direction keys, or motion sensor, for controlling a position of a small cursor image presented on the display 1614 and issuing commands associated with graphical elements presented on the display 1614. In some embodiments, for example, in embodiments in which the computer system 1600 performs all functions automatically without human input, one or more of external input device 1612, display device 1614 and pointing device 1616 is omitted.

In the illustrated embodiment, special purpose hardware, such as an application specific integrated circuit (ASIC) 1620, is coupled to bus 1610. The special purpose hardware is configured to perform operations not performed by processor 1602 quickly enough for special purposes. Examples of application specific ICs include graphics accelerator cards for generating images for display 1614, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1600 also includes one or more instances of a communications interface 1670 coupled to bus 1610. Communication interface 1670 provides a one-way or two-way communication coupling to a variety of external devices that operate with their own processors, such as printers, scanners and external disks. In general, the coupling is with a network link 1678 that is connected to a local network 1680 to which a variety of external devices with their own processors are connected. For example, communication interface 1670 may be a parallel port or a serial port or a universal serial bus (USB) port on a personal computer. In some embodiments, communications interface 1670 is an integrated services digital network (ISDN) card or a digital subscriber line (DSL) card or a telephone modem that provides an information communication connection to a corresponding type of telephone line. In some embodiments, a communication interface 1670 is a cable modem that converts signals on bus 1610 into signals for a communication connection over a coaxial cable or into optical signals for a communication connection over a fiber optic cable. As another example, communications interface 1670 may be a local area network (LAN) card to provide a data communication connection to a compatible LAN, such as Ethernet. Wireless links may also be implemented. For wireless links, the communications interface 1670 sends or receives or both sends and receives electrical, acoustic or electromagnetic signals, including infrared and optical signals, that carry information streams, such as digital data. For example, in wireless handheld devices, such as mobile telephones like cell phones, the communications interface 1670 includes a radio band electromagnetic transmitter and receiver called a radio transceiver. In certain embodiments, the communications interface 1670 enables connection to the communication network 121 for mapping VRUs.

The term computer-readable medium is used herein to refer to any medium that participates in providing information to processor 1602, including instructions for execution. Such a medium may take many forms, including, but not limited to, non-volatile media, volatile media and transmission media. Non-volatile media include, for example, optical or magnetic disks, such as storage device 1608. Volatile media include, for example, dynamic memory 1604. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

FIG. 17 illustrates a chip set 1700 upon which an embodiment may be implemented. Chip set 1400 is programmed to map VRUs as described herein and includes, for instance, the processor and memory components described with respect to FIG. 16 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip.

In one embodiment, the chip set 1700 includes a communication mechanism such as a bus 1701 for passing information among the components of the chip set 1700. A processor 1703 has connectivity to the bus 1701 to execute instructions and process information stored in, for example, a memory 1705. The processor 1703 may include one or more processing cores with each core configured to perform independently. A multi-core processor enables multiprocessing within a single physical package. Examples of a multi-core processor include two, four, eight, or greater numbers of processing cores. Alternatively or in addition, the processor 1703 may include one or more microprocessors configured in tandem via the bus 1701 to enable independent execution of instructions, pipelining, and multithreading. The processor 1703 may also be accompanied with one or more specialized components to perform certain processing functions and tasks such as one or more digital signal processors (DSP) 1707, or one or more application-specific integrated circuits (ASIC) 1709. A DSP 1707 typically is configured to process real-world signals (e.g., sound) in real time independently of the processor 1703. Similarly, an ASIC 1709 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1703 and accompanying components have connectivity to the memory 1705 via the bus 1701. The memory 1705 includes both dynamic memory (e.g., RAM, magnetic disk, writable optical disk, etc.) and static memory (e.g., ROM, CD-ROM, etc.) for storing executable instructions that when executed perform the inventive steps described herein to map VRUs. The memory 1705 also stores the data associated with or generated by the execution of the inventive steps.

FIG. 18 is a diagram of exemplary components of a mobile terminal 1801 (e.g., handset, vehicle or part thereof, etc.) capable of operating in the system of FIG. 1, according to one embodiment. Generally, a radio receiver is often defined in terms of front-end and back-end characteristics. The front-end of the receiver encompasses all of the Radio Frequency (RF) circuitry whereas the back-end encompasses all of the base-band processing circuitry. Pertinent internal components of the telephone include a Main Control Unit (MCU) 1803, a Digital Signal Processor (DSP) 1805, and a receiver/transmitter unit including a microphone gain control unit and a speaker gain control unit. A main display unit 1807 provides a display to the user in support of various applications and mobile station functions that offer automatic contact matching. An audio function circuitry 1809 includes a microphone 1811 and microphone amplifier that amplifies the speech signal output from the microphone 1811. The amplified speech signal output from the microphone 1811 is fed to a coder/decoder (CODEC) 1813.

A radio section 1815 amplifies power and converts frequency in order to communicate with a base station, which is included in a mobile communication system, via antenna 1817. The power amplifier (PA) 1819 and the transmitter/modulation circuitry are operationally responsive to the MCU 1803, with an output from the PA 1819 coupled to the duplexer 1821 or circulator or antenna switch, as known in the art. The PA 1819 also couples to a battery interface and power control unit 1820.

In use, a user of mobile station 1801 speaks into the microphone 1811 and his or her voice along with any detected background noise is converted into an analog voltage. The analog voltage is then converted into a digital signal through the Analog to Digital Converter (ADC) 1823. The control unit 1803 routes the digital signal into the DSP 1805 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wireless fidelity (WiFi), satellite, and the like.

The encoded signals are then routed to an equalizer 1825 for compensation of any frequency-dependent impairments that occur during transmission though the air such as phase and amplitude distortion. After equalizing the bit stream, the modulator 1827 combines the signal with a RF signal generated in the RF interface 1829. The modulator 1827 generates a sine wave by way of frequency or phase modulation. In order to prepare the signal for transmission, an up-converter 1831 combines the sine wave output from the modulator 1827 with another sine wave generated by a synthesizer 1833 to achieve the desired frequency of transmission. The signal is then sent through a PA 1819 to increase the signal to an appropriate power level. In practical systems, the PA 1819 acts as a variable gain amplifier whose gain is controlled by the DSP 1805 from information received from a network base station. The signal is then filtered within the duplexer 1821 and optionally sent to an antenna coupler 1835 to match impedances to provide maximum power transfer. Finally, the signal is transmitted via antenna 1817 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile station 1801 are received via antenna 1817 and immediately amplified by a low noise amplifier (LNA) 1837. A down-converter 1839 lowers the carrier frequency while the demodulator 1841 strips away the RF leaving only a digital bit stream. The signal then goes through the equalizer 1825 and is processed by the DSP 1805. A Digital to Analog Converter (DAC) 1843 converts the signal and the resulting output is transmitted to the user through the speaker 1845, all under control of a Main Control Unit (MCU) 1803—which can be implemented as a Central Processing Unit (CPU) (not shown).

The MCU 1803 receives various signals including input signals from the keyboard 1847. The keyboard 1847 and/or the MCU 1803 in combination with other user input components (e.g., the microphone 1811) comprise a user interface circuitry for managing user input. The MCU 1803 runs a user interface software to facilitate user control of at least some functions of the mobile station 1801 to map VRUs. The MCU 1803 also delivers a display command and a switch command to the display 1807 and to the speech output switching controller, respectively. Further, the MCU 1803 exchanges information with the DSP 1805 and can access an optionally incorporated SIM card 1849 and a memory 1851. In addition, the MCU 1803 executes various control functions required of the station. The DSP 1805 may, depending upon the implementation, perform any of a variety of conventional digital processing functions on the voice signals. Additionally, DSP 1805 determines the background noise level of the local environment from the signals detected by microphone 1811 and sets the gain of microphone 1811 to a level selected to compensate for the natural tendency of the user of the mobile station 1801.

The CODEC 1813 includes the ADC 1823 and DAC 1843. The memory 1851 stores various data including call incoming tone data and is capable of storing other data including music data received via, e.g., the global Internet. The software module could reside in RAM memory, flash memory, registers, or any other form of writable computer-readable storage medium known in the art including non-transitory computer-readable storage medium. For example, the memory device 1851 may be, but not limited to, a single memory, CD, DVD, ROM, RAM, EEPROM, optical storage, or any other non-volatile or non-transitory storage medium capable of storing digital data.

An optionally incorporated SIM card 1849 carries, for instance, important information, such as the cellular phone number, the carrier supplying service, subscription details, and security information. The SIM card 1849 serves primarily to identify the mobile station 1801 on a radio network. The card 1849 also contains a memory for storing a personal telephone number registry, text messages, and user specific mobile station settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A computer-implemented method for operating a vehicle based on vulnerable road user data comprising:
   determining a road link on which the vehicle is traveling or expects to travel;
   querying a geographic database for a vulnerable road user attribute of the road link, wherein a value of the vulnerable road user attribute is impacted based on an identification of one or more vulnerable road user map features including places or objects where vulnerable road users have been observed or known to be present; and
   providing a notification or instruction to activate or deactivate an autonomous driving mode of the vehicle, a vehicle sensor of the vehicle, or a combination thereof while the vehicle travels on the road link based on determining that the vulnerable road user attribute meets a threshold criterion,
   wherein the threshold criterion includes a threshold value that indicates a probability of a presence of a vulnerable road user on the road link is greater than a target probability, and wherein the vehicle sensor is activated to detect the presence of the vulnerable road user while the vehicle is traveling the road link based on determining that the vulnerable road user attribute is greater than the threshold value.

2. The method of claim 1, wherein the querying of the geographic database further comprises determining that a time at which the vehicle is traveling or expects to travel on the road link lies within a time epoch associated with the vulnerable road user attribute in the geographic database.

3. The method of claim 1, wherein the vulnerable road user attribute includes an attribute indicating a density of vulnerable road users on the road link.

4. The method of claim 1, wherein the threshold criterion includes a first threshold value that indicates a probability of a presence of a vulnerable road user on the road link is greater than a first target probability, and wherein the autonomous driving mode is deactivated to transition the vehicle to a manual driving mode while traveling on the road link based on determining that the vulnerable road user attribute is greater than the first threshold value.

5. The method of claim 4, wherein the threshold criterion includes a second threshold value that indicates the probability of the presence of the vulnerable road user on the road link is less than the first target probability and greater than a second target probability, and wherein the autonomous driving mode is deactivated to transition the vehicle to a semi-autonomous driving mode while traveling on the road link based on determining that the vulnerable road user attribute is less than the first threshold value and greater than the second threshold value.

6. The method of claim 5, wherein the autonomous driving mode is activated or maintained on the vehicle while traveling the road link based on determining that the vulnerable road user attribute is less than the second threshold value.

7. The method of claim 1, wherein the vehicle sensor includes an advanced capability to detect a presence of the vulnerable road user on the road link at a performance level greater than another vehicle sensor, and wherein the vehicle sensor with the advanced capability is operated on demand for vulnerable road user detection and the another vehicle sensor is operated continuously.

8. The method of claim 7, wherein the vehicle sensor includes a LiDAR sensor, an infrared sensor, a radar sensor, or a combination thereof, and wherein the another vehicle sensor includes a camera sensor.

9. The method of claim 1, further comprising:
   determining that the vehicle is not equipped with the vehicle sensor, that the vehicle sensor is not functioning, or a combination thereof, wherein the vehicle sensor is configured to detect a presence of a vulnerable road user; and
   estimating the presence of the vulnerable road user on the road link based on the vulnerable road attribute queried from the geographic database.

10. An apparatus for operating a vehicle based on vulnerable road user data comprising:
   at least one processor; and
   at least one memory including computer program code for one or more programs,
   the at least one memory and the computer program code configured to, with the at least one processor, cause the apparatus to perform at least the following,
   determine a road link on which the vehicle is traveling or expects to travel;
   query a vulnerable road user data layer of a geographic database for the vulnerable road user data corresponding to the road link, wherein a value of a corresponding vulnerable road user attribute of the vulnerable road user data is impacted based on an identification of one or more physical dividers associated with the road link;
   query the geographic database to determine whether the road link contains one or more vulnerable road user map features, wherein a value of the vulnerable road user attribute is impacted based on an identification of the one or more vulnerable road user map features including places or objects where vulnerable road users have been observed or known to be present; and
   provide a notification or instruction to activate or deactivate an autonomous driving mode of the vehicle, a vehicle sensor of the vehicle, or a combination thereof while the vehicle travels on the road link based on determining that the vulnerable road user attribute meets a threshold criterion, wherein the threshold criterion includes a threshold value that indicates a probability of a presence of a vulnerable road user on the road link is greater than a target probability, and wherein the vehicle sensor is activated to detect the presence of the vulnerable road user while the vehicle is traveling the road link based on determining that the vulnerable road user attribute is greater than the threshold value.

11. The apparatus of claim 10, wherein the vulnerable road attribute comprises one or more vulnerable road user patterns that represent respective values of the vulnerable road user attribute generated across a plurality of time epochs, and wherein the querying of the geographic database further comprises determining that a time at which the vehicle is traveling or expects to travel on the road link lies within a time epoch of the plurality of time epochs associated with a corresponding vulnerable road user attribute of the vulnerable road user data.

12. The apparatus of claim 10, wherein the threshold criterion includes a first threshold value that indicates a probability of a presence of a vulnerable road user on the road link is greater than a first target probability, and wherein the autonomous driving mode is deactivated to transition the vehicle to a manual driving mode while traveling on the road link based on determining that the vulnerable road user data is greater than the first threshold value.

13. The apparatus of claim 12, wherein the threshold criterion includes a second threshold value that indicates the probability of the presence of the vulnerable road user on the road link is less than the first target probability and greater than a second target probability, and wherein the autonomous driving mode is deactivated to transition the vehicle to a semi-autonomous driving mode while traveling on the road link based on determining that the vulnerable road user attribute is less than the first threshold value and greater than the second threshold value.

14. The apparatus of claim 13, wherein the autonomous driving mode is activated or maintained on the vehicle while traveling the road link based on determining that the vulnerable road user attribute is less than the second threshold value.

15. A non-transitory computer-readable storage medium for generating vulnerable road user data for a geographic database, carrying one or more sequences of one or more instructions which, when executed by one or more processors, cause an apparatus to perform:
determining a road link on which the vehicle is traveling or expects to travel;
querying a geographic database for a vulnerable road user attribute of the road link,
wherein the vulnerable road user attribute is calculated for a specific lane corresponding to the road link having a plurality of lanes,
wherein a value of the vulnerable road user attribute is impacted based on an identification of one or more vulnerable road user map features including places or objects where vulnerable road users have been observed or known to be present; and
providing a notification or instruction to activate or deactivate an autonomous driving mode of the vehicle, a vehicle sensor of the vehicle, or a combination thereof while the vehicle travels on the road link based on determining that the vulnerable road user attribute meets a threshold criterion,
wherein the threshold criterion includes a threshold value that indicates a probability of a presence of a vulnerable road user on the road link is greater than a target probability, and wherein the vehicle sensor is activated to detect the presence of the vulnerable road user while the vehicle is traveling the road link based on determining that the vulnerable road user attribute is greater than the threshold value.

16. The non-transitory computer-readable storage medium of claim 15, wherein the querying of the geographic database further comprises determining that a time at which the vehicle is traveling or expects to travel on the road link lies within a time epoch associated with the vulnerable road user attribute in the geographic database.

17. The non-transitory computer-readable storage medium of claim 15, wherein the vulnerable road user attribute includes an attribute indicating a density of vulnerable road users on the road link.

18. The non-transitory computer-readable storage medium of claim 15, wherein the threshold criterion includes a threshold value that indicates a probability of a presence of a vulnerable road user on the road link is greater than a target probability, and wherein the vehicle sensor is activated to detect the presence of the vulnerable road user while the vehicle is traveling the road link based on determining that the vulnerable road user attribute is greater than the threshold value.

19. The non-transitory computer-readable storage medium of claim 15, wherein the vehicle sensor includes an advanced capability to detect a presence of the vulnerable road user on the road link at a performance level greater than another vehicle sensor, and wherein the vehicle sensor with the advanced capability is operated on demand for vulnerable road user detection and the another vehicle sensor is operated continuously.

* * * * *